United States Patent [19]

Tsujihara et al.

[11] Patent Number: 5,414,330
[45] Date of Patent: May 9, 1995

[54] CATHODE RAY TUBE CONTROL APPARATUS

[75] Inventors: Susumu Tsujihara, Neyagawa; Mitsuo Isobe, Osaka; Hiroyosi Shimosaka; Hiroshi Taniguchi, both of Hirakata, all of Japan

[73] Assignee: Matsushita Electric Industrial Co., Ltd., Osaka, Japan

[21] Appl. No.: 20,567

[22] Filed: Feb. 22, 1993

[30] Foreign Application Priority Data

Feb. 20, 1992 [JP] Japan ................................. 4-033093
Oct. 8, 1992 [JP] Japan ................................. 4-269858

[51] Int. Cl.[6] .................. G09G 1/04; H01J 31/26; H01J 29/10
[52] U.S. Cl. ................................ 315/371; 315/10; 313/471
[58] Field of Search ............... 315/368.11, 10, 371; 313/471, 402, 408

[56] References Cited

U.S. PATENT DOCUMENTS 4,414,571 11/1983 Kureha et al. .
4,456,853 6/1984 Robinder et al. ............ 313/421
4,617,495 10/1986 Cutler ............................ 315/10
4,857,998 8/1989 Tsujihara et al. .
5,111,284 5/1992 Tsujihara et al. .

FOREIGN PATENT DOCUMENTS 0186136 7/1986 European Pat. Off. .
2102258 1/1983 United Kingdom .

*Primary Examiner*—Gregory C. Issing
*Attorney, Agent, or Firm*—Ratner & Prestia

[57] ABSTRACT

A cathode ray tube control apparatus includes phosphor display screen, three electron guns for emitting R, G, B electron beams to the display screen, a shadow mask placed between the electron guns and the display screen, and index phosphors deposited on the shadow mask and having at least two line elements diagonal to a horizontal scanning direction of the electron beam for generating a signal according to the electron beam scan. Further provided are detector for detecting beam crossing points over the index phosphor, and correction circuit for correcting the deflection of the electron beam based on the detected beam crossing points.

9 Claims, 35 Drawing Sheets

Fig. 8a
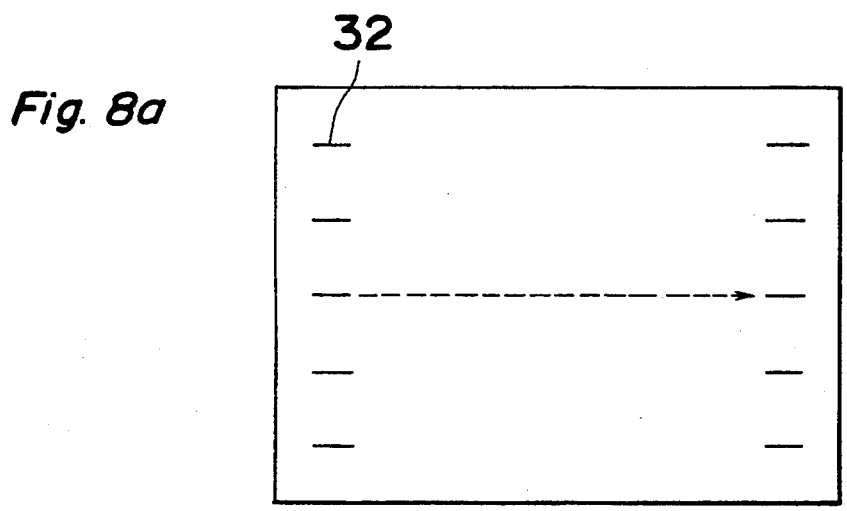
Fig. 8b 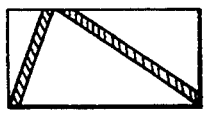 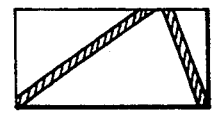 Fig. 8c
Fig. 8d 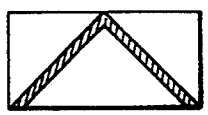 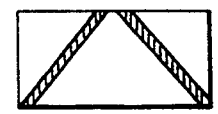 Fig. 8e
Fig. 8f 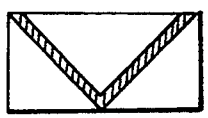 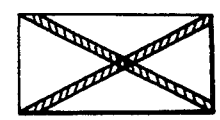 Fig. 8g
Fig. 8h 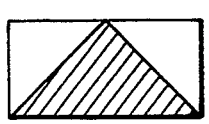 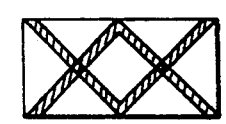 Fig. 8i

Fig. 17

| STANDARD WAVEFORM | CONVE-RGENCE COIL | CORRECTION | | | STANDARD WAVEFORM | CONVE-RGENCE COIL | CORRECTION | |
|---|---|---|---|---|---|---|---|---|
| (1) V-SAWTOOTH | V | V AMP | | | (3) H-SAWTOOTH | V | ORTH CRRCT (H-LINE) | |
| | H | ORTH CRRCT (V-LINE) | | | | H | H AMP | |
| (2) V-PARABOLA | V | V LINEARITY | | | (4) H-PARABOLA | V | H CURVATURE CRRCT | |
| | H | V CURVATURE CRRCT | | | | H | H LINEARITY | |

V: VERTICAL
H: HORIZONTAL

--- R
— G
--- B

CATHODE RAY TUBE CONTROL APPARATUS

BACKGROUND OF THE INVENTION

1. Field of the Invention

The present invention relates to an apparatus for image correction in a color television receiver, and particularly to a cathode ray tube control apparatus for automatically applying various corrections.

2. Description of the Prior Art

In a conventional video projector that projects an enlarged image to a screen using three projection tubes, each projecting one of the three primary colors, differences in the incidence angle of each projection tube to the screen (hereafter "convergence angle") can result in color shifting on the screen, blurred focus, deflection distortion, and changes in brightness. To compensate for these possible sources of image deterioration, an analog correction wave synchronized to the horizontal and vertical scanning periods is typically generated, and the amplitude and shape of this wave are appropriately adjusted. There are problems with the correction precision of this method, however. In addition, this is also a time-consuming adjustment because the adjustments are made manually with the technician visually confirming the adjustments on screen. A digital convergence apparatus (Japanese patent laid-open 59-8114) providing a high convergence precision adjustment, and a cathode ray tube control apparatus (electron beam deflection control apparatus) (Japanese patent laid-open 58-25042 and 58-24186, U.S. Pat. No. 4,456,853 to Robinder et al., U.S. Pat. No. 4,857,998 to Tsujihara et al. and U.S. Pat. No. 5,111,284 to Tsujihara et al.) for automatically correcting deflection distortion have been proposed as ways of correcting these problems.

FIG. 28 is a block diagram of a conventional cathode ray tube control apparatus with an automatic correction capability, and FIG. 29 is a screen image of the index phosphors in the corresponding cathode ray tube. As shown in FIGS. 28 and 29, the position of the electron beam from the index phosphor 6 coated on the shadow mask 43 surface of the cathode ray tube (CRT) 40 is detected by a detector 60. The detection signal output from the detector 60 is used by the process controller 66 to generate the signals for convergence correction and image geometry (geometric distortion) correction. The signal from the process controller 66 is input to the waveform generator 52. The waveform generator 52 thus generates the scanning waves driving the convergence yoke 44 and deflection yoke 46, and convergence and image geometry are automatically corrected. It is therefore possible as described above to automatically correct the electron beam position and thus control convergence and image geometry.

The problem with this conventional cathode ray tube control apparatus is that the index phosphor coating must be applied precisely perpendicular to the main scanning direction because the index phosphor comprises the vertical and hypotenuse legs of a right triangle where the vertical leg is perpendicular to the main scanning direction. This is a problem because the coating process requires a high precision coating technology. In addition, when measuring the position of the test signals 8, 9 emitted to the index phosphor, the measurement precision, and hence the correction precision, drop when the time measurement range between two index phosphors is very large, or the signal width varies because of the spot characteristics or aberrations in the test signal (beam). Finally, because the number of convergence correction points is determined by the number of index phosphors coated on the cathode ray tube, this conventional method cannot adapt to a variable number of correction points.

SUMMARY OF THE INVENTION

Therefore, an object of the present invention is to provide a cathode ray tube control apparatus enabling high precision image correction while significantly shortening the adjustment time. This is made possible by providing two index phosphors in the shadow mask diagonally to the main scanning direction, and detecting and automatically correcting the electron and optical beam positions.

To achieve this object, the first embodiment of the invention achieves an index phosphor-coated cathode ray tube of simple construction by means of detection elements, each being two shapes diagonal to the main scanning direction of the electron beam, arrayed at predetermined positions on the shadow mask surface for generating a signal expressing the position of the electron beam scan, and a means for detecting the two-dimensional position of the electron beam and deflecting the electron beam according to the output signals from the detection elements. This first embodiment is characterized by detecting the two-dimensional position of the electron beam by emitting detection signals based on the electron beam scan.

The second embodiment of the invention comprises a processing means for obtaining the two-dimensional position of the electron beam from the distance between the shadow mask surface and the phosphor surface and the detection signal obtained based on the feedback signal of the electron beam from the shadow mask surface, controlling the deflection means, and correcting the deflection distortion of the electron beam. Errors based on any offset between the display surface and the detection surface on which the index phosphor is provided can be compensated for with high precision by obtaining the two-dimensional position of the electron beam from the distance between the shadow mask surface and the phosphor surface and the detection signal obtained from the electron beam feedback signal from the shadow mask, and controlling the deflection means to correct for the deflection distortion of the electron beam.

The third embodiment of the invention comprises a processing means for obtaining the two-dimensional position of the electron beam from the detection signals based on the electron beam feedback signal from the shadow mask and the width of each detection signal, controlling the deflection means, and compensating for the electron beam deflection distortion. Correction error due to the beam spot size and aberrations can be compensated for and high precision correction can be achieved by obtaining the two-dimensional position of the electron beam from the detection signals based on the electron beam feedback signal from the shadow mask and the width of each detection signal, and compensating for the electron beam deflection distortion based on this signal.

The fourth embodiment of the invention comprises a video output means for sequentially outputting a sequential scan detection test signal to the detection means, a deflection means for deflecting the electron beam of the cathode ray tube, and a processing means for obtaining the two-dimensional position of the electron beam according to the detection signals from the detection means and controlling the deflection means to correct the deflection distortion of the electron beam. This embodiment enables high precision image compensation because stable, high precision measurement of the electron beam position is made possible by sequentially outputting the sequential scan detection test signal to the detection means to obtain the two-dimensional position of the electron beam, and controlling the deflection means according to this signal to correct the deflection distortion of the electron beam.

The fifth embodiment of the invention comprises an evaluation means for determining whether the detection signal output from the detection means corresponds to the position detection element at a predetermined position, and a control means for obtaining the two-dimensional position of the electron beam from the detection signals, and controlling the deflection according to the evaluation signal to control the operation correcting electron beam deflection distortion. This embodiment achieves a display device requiring absolutely no adjustment because false detection of abnormal operation in the detection system caused by the signals from the position detection elements can be automatically detected by determining whether the detection signal corresponds to the position detection element at a predetermined position, and controlling the deflection means, and thus the correction operation applied for deflection distortion of the electron beam, according to this signal.

The sixth embodiment of the invention comprises a control means for obtaining the two-dimensional position of the electron beam from the detection signals corresponding to the position detection elements and output from the detection means, and controlling the deflection means to control the operation correcting electron beam deflection distortion, and a calculation means for moving the test signal between adjustment points and calculating the correction amount between adjustment points. High precision correction around the image area can be achieved with this embodiment because the correction precision between adjustment points is improved and the correction amount for extrapolated points outside the screen area can be automatically calculated by moving the test signal between adjustment points and calculating the correction amount between adjustment points.

BRIEF DESCRIPTION OF THE DRAWINGS

The present invention will become more fully understood from the detailed description given below and the accompanying diagrams wherein:

FIG. 8a is a diagram of the screen showing the steps to produce test signals, FIGS. 8b, 8c, 8d, 8e, 8f, 8g, 8h and 8i are diagrams showing various patterns of index phosphor according to the present invention, FIG. 17 is a table showing the relationship between correction wave and the correction change used to describe the operation of the second embodiment of the invention.

DETAILED DESCRIPTION OF THE PREFERRED EMBODIMENTS

The preferred embodiments of the present invention are described herein below with reference to the accompanying figures, of which FIGS. 1–9 are block diagrams and illustrations used to describe the cathode ray tube control apparatus according to the first embodiment of the invention. FIG. 1a shows a portion of one index phosphor 6 according to the present invention, and FIGS. 1b and 1c show diagrams of the index phosphors provided on CRT screen in different patterns.

Figure 1A:
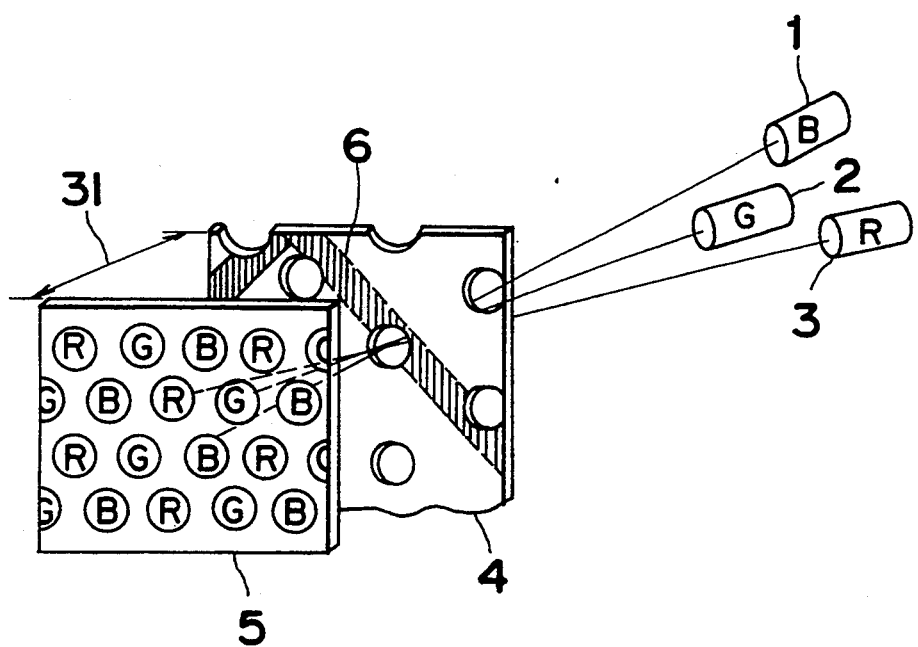
FIG. 1a is a configuration diagram of a cathode ray tube control apparatus according to the present invention.

Referring to FIG. 1a, the red, green, and blue (hereafter RGB) electron guns 1, 2, and 3 each emits an electron beam of the corresponding color. The index phosphor 6 is applied to the shadow mask 4, which is positioned between the electron guns and the phosphor screen 5. The phosphor screen 5 is coated with RGB phosphors.

Figure 1B:
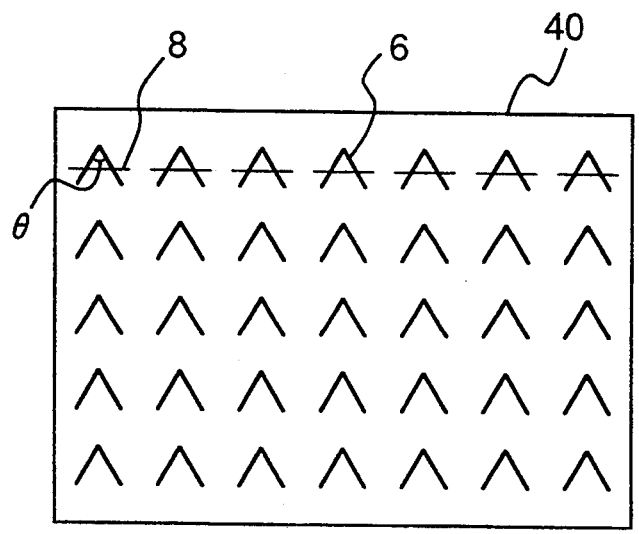
FIGS. 1b and 1c are index phosphors provided on the screen, according to the present invention.
Figure 1C:
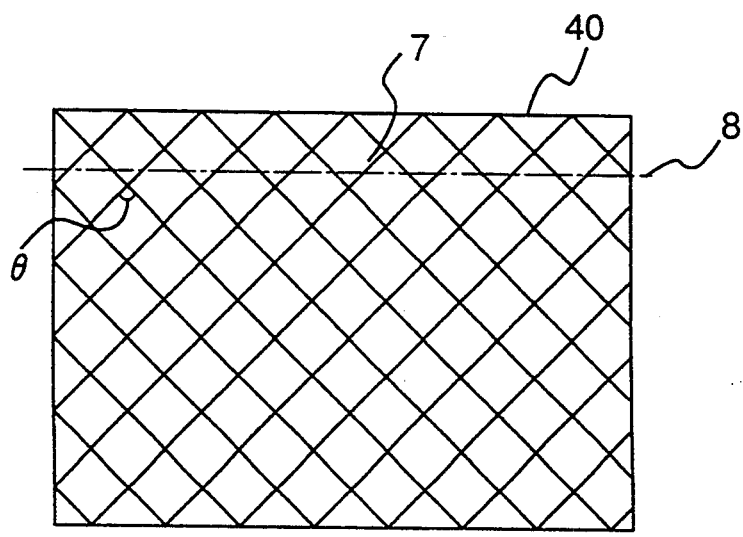

According to the present invention, each index phosphor 6 is formed by two slanted line elements containing an angle $\theta(0° < \theta < 180°$, preferably $40° < \theta < 140°)$, as shown in FIG. 1b or 1c. Each of the two line elements is slanted, preferably at the same but in opposite angle, with respect to a horizontal scan direction of the electron beam, and plural index phosphors 6 are coated continuously to the shadow mask 4. The full screen of index phosphors 6 coated to the shadow mask 4 surface of a CRT 40 is shown in FIG. 1b or in 1c. A test signal intersects the two slanted line segments of each index phosphor 6.

Figure 2A:
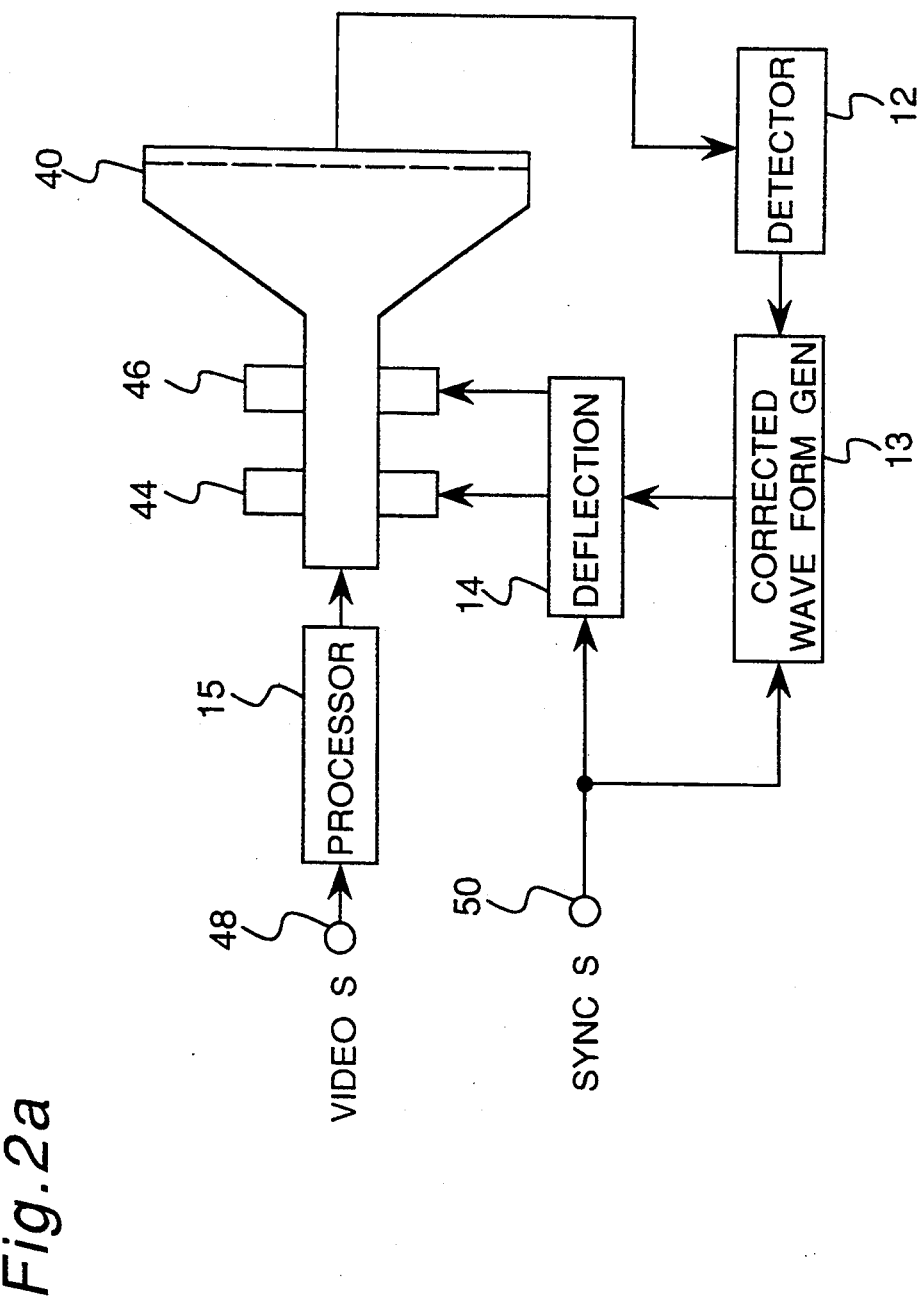
FIG. 2a is a block diagram showing a fundamental structure of the present invention.

Referring to FIG. 2a, a cathode ray tube control apparatus according to the first embodiment is shown.

A synchronizing signal is input to an input terminal 50. A deflection circuit 14 generates a correction current for the raster scan of the screen, and supplies this correction current to a deflection yoke 46 and a convergence yoke 44 to control the scanning speed. A video signal from an input terminal 48 is applied to a signal processor 15, which handles the signal processing and amplification needed to drive the cathode of the CRT 40.

An image projected to the screen of the CRT 40 is extracted as a set of signals identifying the two-dimensional position of the electron (optical) beam scanning across the shadow mask 4. This is achieved by applying test signals 8 for R, G and B each crossing the plural index phosphors arrayed on the shadow mask 4. The feedback signal from the index phosphors is input to the detector 12. The detector 12 detects and measures the position of the test signal 8, and the corrected waveform generator 13 corrects the standard waveform of the beam positioning signal, so as to generate the optimum geometric distortion and convergence correction signal. The corrected waveform from the corrected waveform generator 13 is then supplied to the deflection circuit 14 to control scanning and correct any geometric distortion and convergence error. The corrected waveform generator 13 generates the correction wave used to control convergence, deflection distortion, screen amplitude, and other characteristics based on the measured position shift. This correction wave can be generated using a digital convergence method.

By thus using index phosphors comprising two shapes diagonal to the main electron beam scanning direction and arrayed at predetermined positions on the surface of the shadow mask, convergence and geometric distortion can be automatically corrected by generating an emitted output according to the electron beam scan, detecting the two-dimensional position of the electron beam by means the detector 12, and deflecting the electron beam according to the detection signal from the detector as described above.

The control process of this embodiment is described in further detail below with reference to the block diagram in FIGS. 2b and 2c, and illustrations of convergence yokes in FIGS. 3a, 3b and 3c.

Figure 2B:
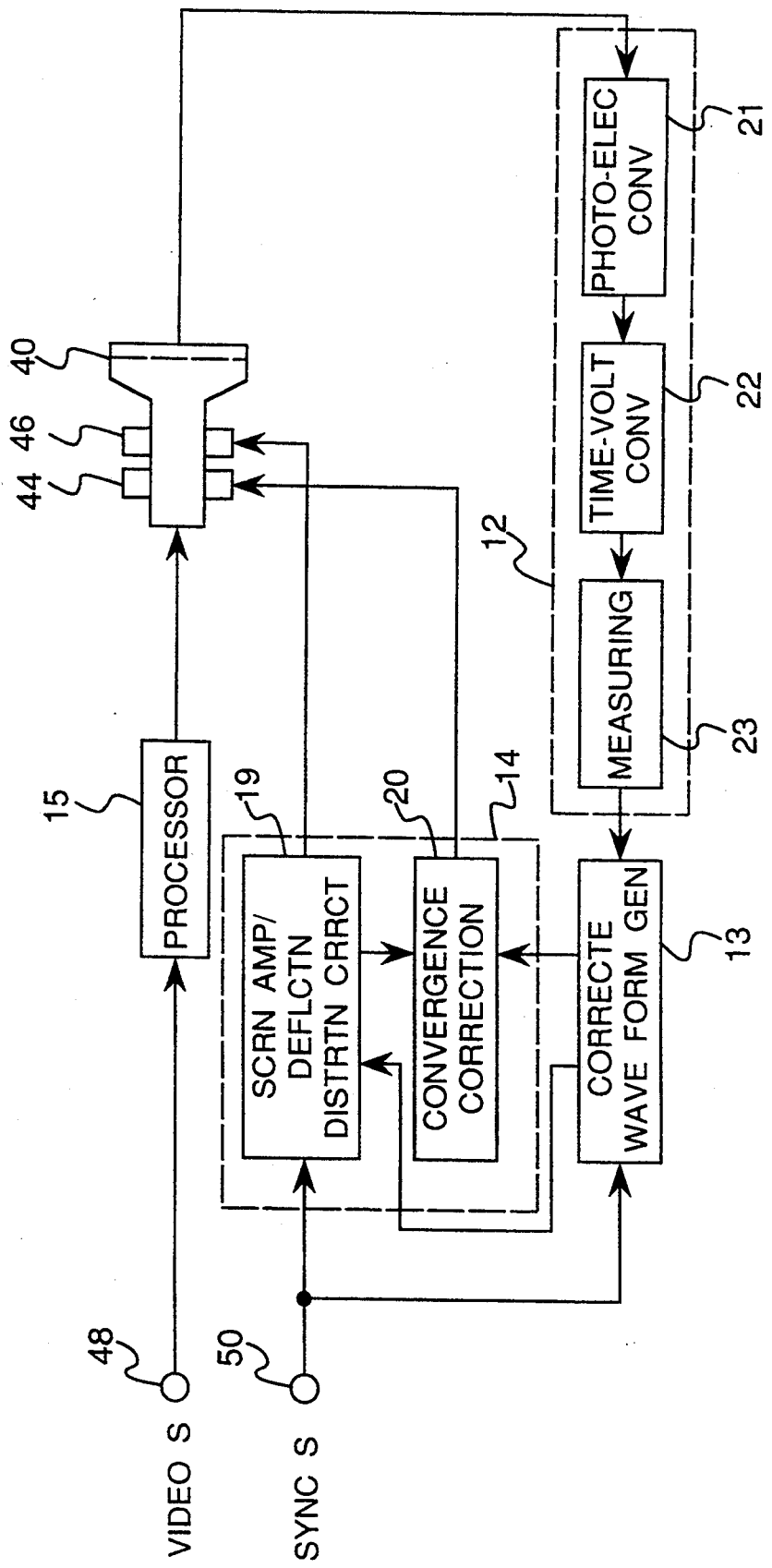
FIG. 2b is a block diagram according to a first embodiment of the present invention.

As shown in FIG. 2b, detector 12 comprises a photoelectric conversion element 21, a time-voltage converter 22, and a measuring circuit 23. Also, the deflection circuit 14 comprises a screen amplitude and deflection distortion correction circuit 19 and a convergence correction circuit 20. This deflection circuit 14 drives the deflection coil of the deflection yoke 46 to correct any deflection distortion based on the correction data for the screen amplitude and the deflection linearity corrected waveform to maintain a uniform color display field for each color across the entire screen. It also drives the convergence yoke 44 based on the color shift corrected waveform and data to correct the convergence so that the display area of each color is the same throughout the entire screen.

Figure 2C:
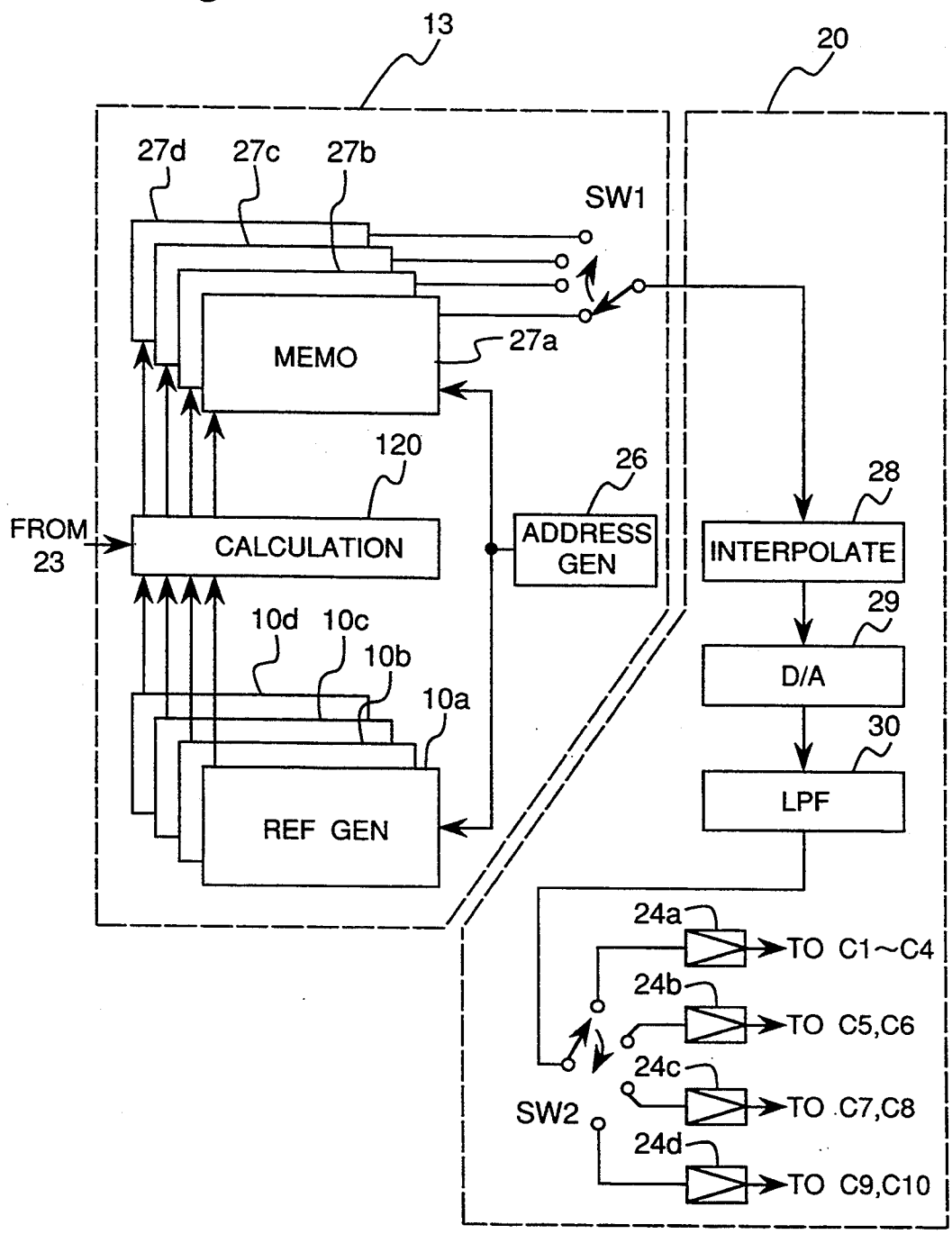
FIG. 2c is a block diagram showing a detail of the correct waveform generator and the convergence correction circuit shown in FIG. 2b, FIGS. 3a, 3b and 3c are diagrams showing coil arrangements provided on the convergence yoke.

As shown in FIG. 2c, corrected waveform generator 13 comprises reference generators 10a, 10b, 10c and 10d, each formed by a memory, for storing standard waveforms. For example, reference generators 10a, 10b, 10c and 10d are stored with data such as shown in FIG. 5a, 5b, 5c and 5d, respectively.

Figure 3A:
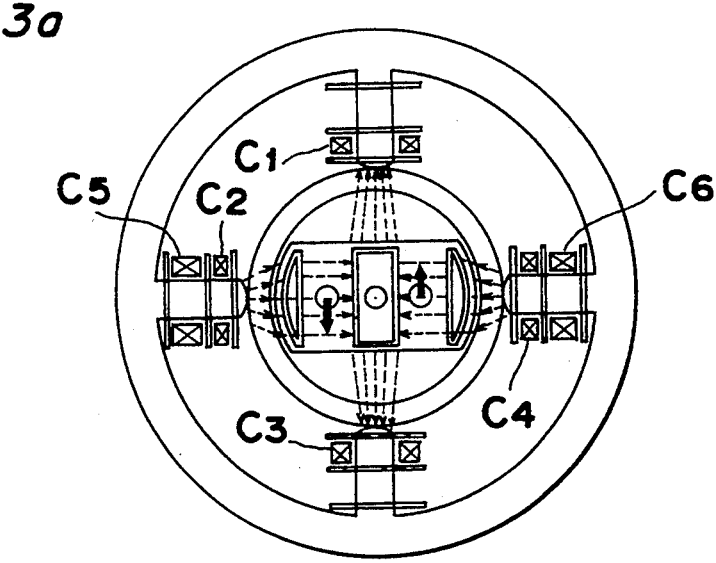
Figure 3B:
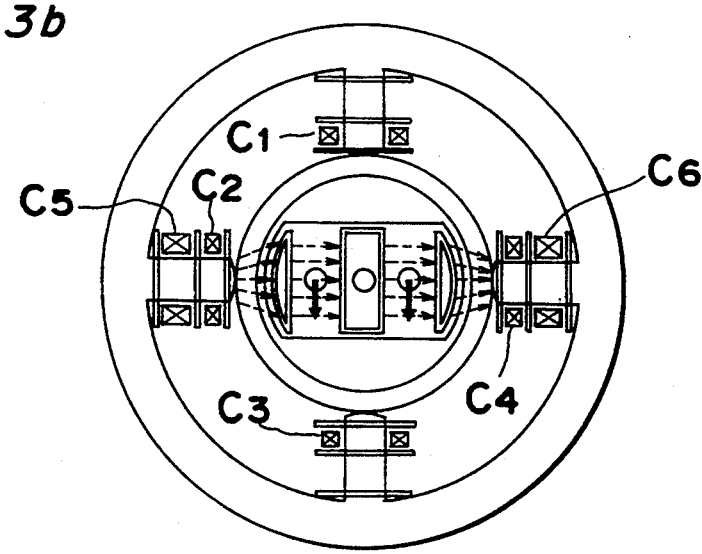
Figure 3C:
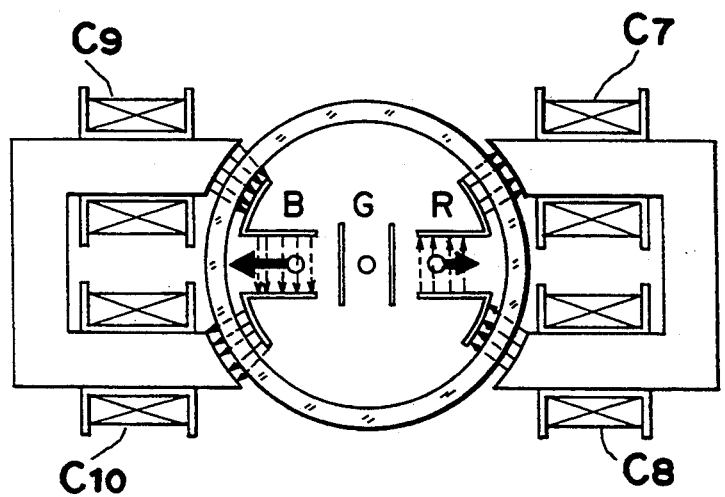
Figure 5A:
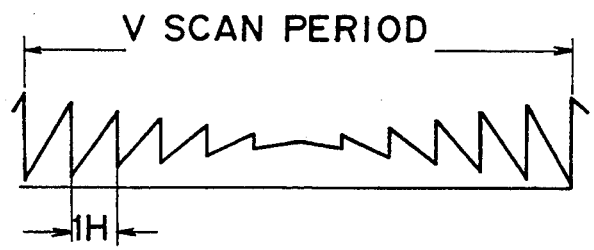
FIGS. 5a, 5b, 5c and 5d are standard waveforms for correcting the deviations shown in FIGS. 30a and 30b, FIGS. 6a, 6b and 6c are graphs showing signals obtained from the circuit of the first embodiment.
Figure 5B:
Figure 5C:
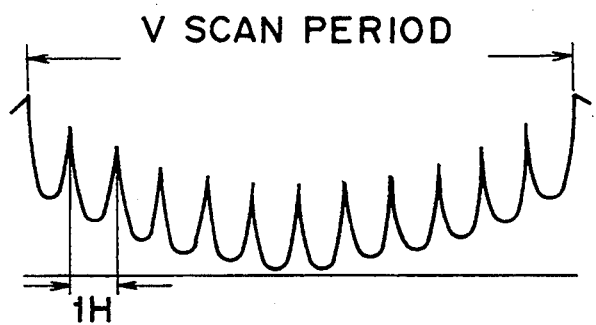
Figure 5D:
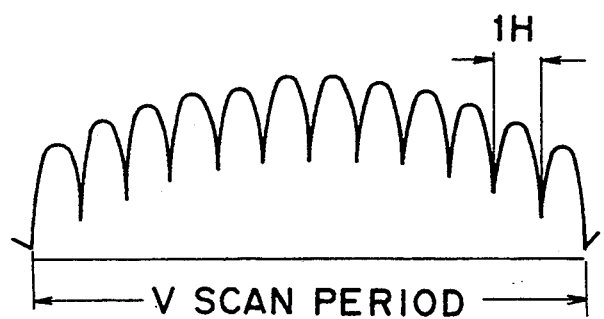
Figure 30A:
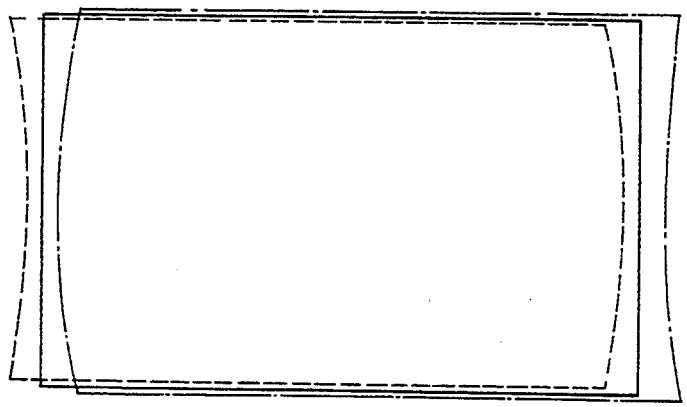
FIGS. 30a and 30b are diagrams showing deviations of the images formed by R, G and B colors.
Figure 30B:
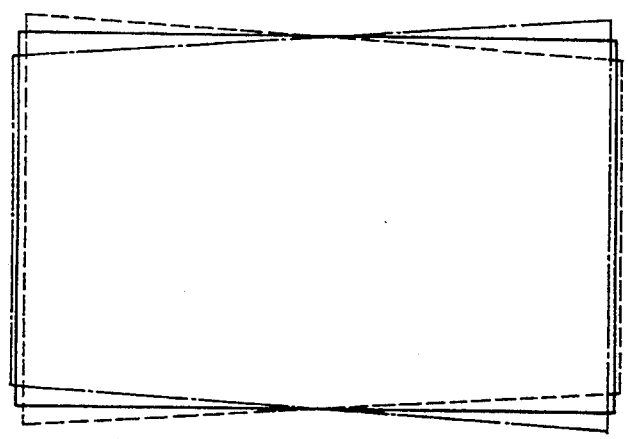

As apparent to those skilled in the art, the standard waveform shown in FIG. 5a, which is a sawtooth waveform, is applied to coils C1, C2, C3 and C4 shown in FIG. 3a to adjust the vertical rotational deflection of the R and B beams (G beam located at the center needs no correction) to correct the vertical rotating image difference, which the three beam CRT intrinsically has, as shown in FIG. 30b. The standard waveform shown in FIG. 5b, which is a plain zero volt signal or a plain ΔV signal, is applied to coils C5 and C6 shown in FIG. 3b to adjust the vertical deflection of the R and B beams. The standard waveform shown in FIG. 5c, which is a downward parabola signal, is applied to coils C7 and C8 shown in FIG. 3c to adjust the horizontal deflection of the R beam, such as shown in FIG. 30a. Finally, the standard waveform shown in FIG. 5d, which is an upward parabola signal, is applied to coils C9 and C10 shown in FIG. 3c to adjust the horizontal deflection of the B beam, such as shown in FIG. 3Oa.

Referring back to FIG. 2c, corrected waveform generator 13 further comprises an address generator 26 for generating various address signals at positions where the index phosphors 6 are located, a calculation circuit 120 for calculating the corrected waveform based on the standard waveform at each sampling point where the index phosphor 6 is located, memories 27a, 27b, 27c and 27d for storing corrected waveforms, and a first switching device SW1 for producing data sequentially from each of the memories 27a, 27b, 27c and 27d in a time sharing manner.

The convergence correction circuit 20 comprises an interpolation circuit 28 for data interpolation between the sampling points where the index phosphors 6 are located, a digital/analog converter (DAC) 29 for converting the interpolated data to an analog quantity, and a low-pass filter (LPF) 30 for smoothing the analog value. The signal from the LPF 30 is applied to a second switching device SW2 and in turn sequentially to amplifiers 24a, 24b, 24c and 24d. Thus, the data from memory 27a and processed in circuits 28, 29 and 30 is applied to amplifier 24a. Similarly, the data from memory 27b is applied to amplifier 24b; from memory 27c to amplifier 24c; and from memory 27d to amplifier 24d. The signal from amplifier 24a is applied to coils C1–C4 shown in FIG. 3a; the signal from amplifier 24b is applied to coils C5 and C6 in FIG. 3b; the signal from amplifier 24c is applied to coils C7 and C8 in FIG. 3c; and the signal from amplifier 24d is applied to coils C9 and C10 in FIG. 3c.

Figure 4A:
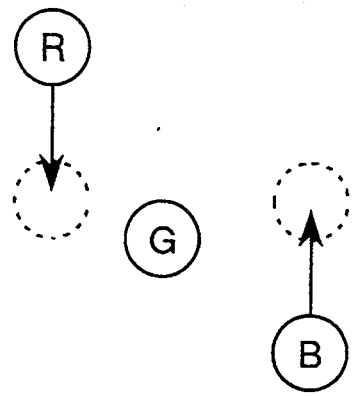
FIGS. 4a, 4b, 4c, 4d and 4e are diagrams showing steps of movements to correct R and B beams.
Figure 4B:
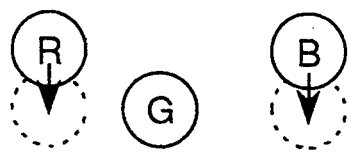
Figure 4C:
Figure 4D:
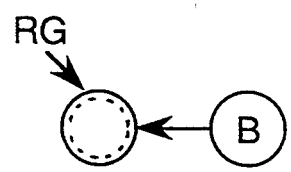
Figure 4E:
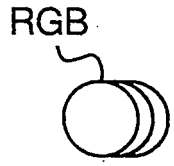

In operation, according to the present invention, R and B beams are shifted in four steps to bring these two R and B beams in alignment with G beam. Here, the term beam is used as a beam spot on the shadow mask 4 where the index phosphor 6 is provided. First, as shown in FIG. 4a, R and B beams are moved vertically by the same amount, but in opposite directions until R and B beams are in the same horizontal level. Second, as shown in FIG. 4b, R and B beams are moved vertically by the same amount and in the same direction until R and B beams are in the same horizontal level as that of the G beam. Third, as shown in FIG. 4c, R beam is moved horizontally until it overlaps with the G beam. Finally, as shown in FIG. 4d, B beam is moved horizontally until it overlaps with the G beam. After these four steps, R, G and B beams at one sampling point will be located at the same beam spot as shown in FIG. 4e. The operation to correct the beam position is carried out at every sampling point where the index phosphor 6 are located.

Next, each of the four steps is described in detail.

Figure 6A:
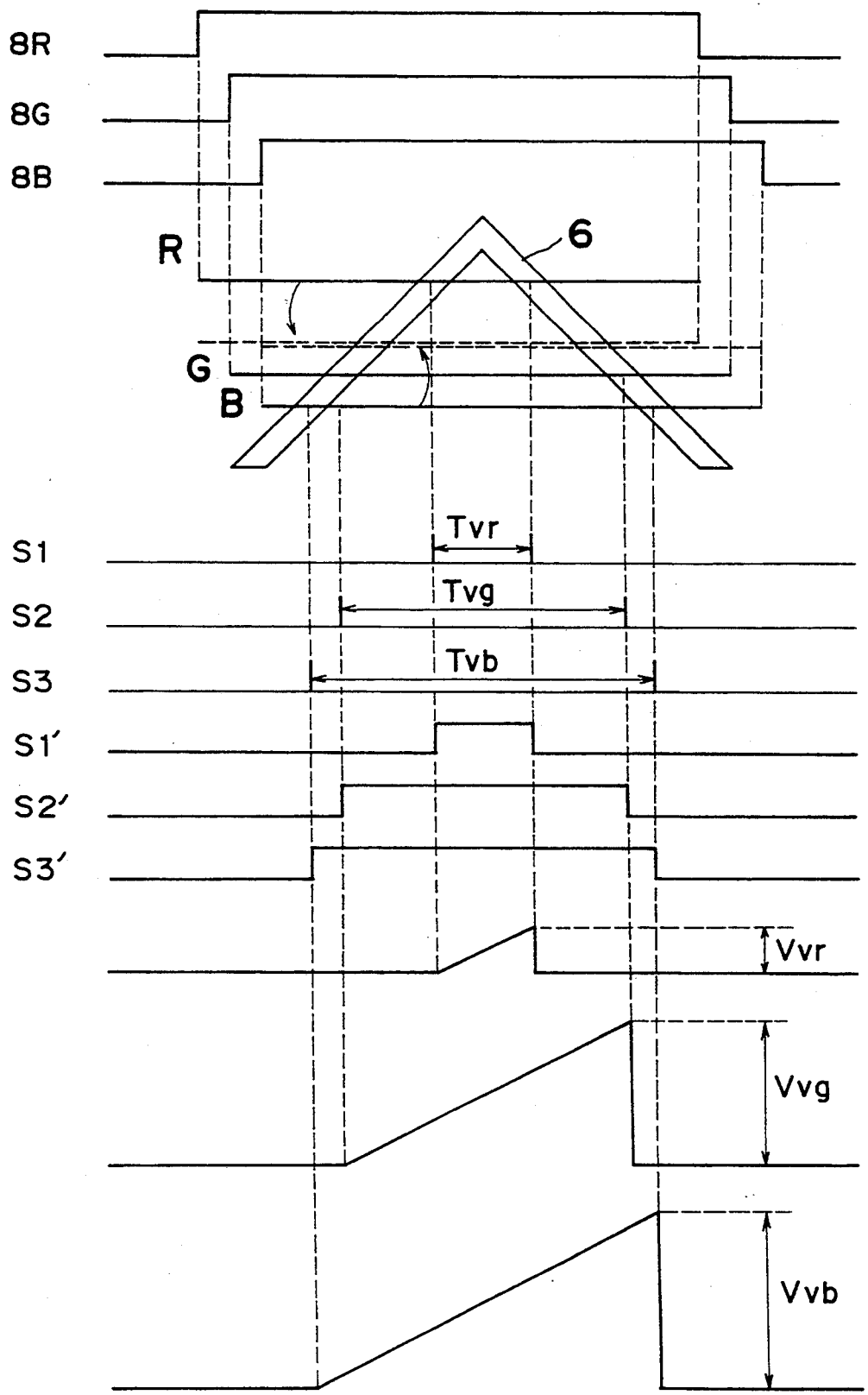

The first step is explained in connection with FIG. 6a. In FIG. 6a, red, green and blue test signals 8R, 8G and 8B are applied one after another separately, so that R-, G- and B-lines are produced on the shadow mask 4 over one index phosphor 6. Since the R and B beams are not yet adjusted, R- and B-lines do not exactly overlap G-line.

When the R-line is depicted in response to the test signal 8R, two pulses (signal S1) having an interval time Tvr are detected by photoelectric conversion element 21 in response to the crossing of the R-line over index phosphor 6. These two pulses are used for generating a gate pulse (signal S1′) from photoelectric conversion element 21. During the generation of the gate pulse (signal S1′), time-voltage converter 22 integrates a constant signal to produce a voltage Vvr indicative of the interval time Tvr.

Similarly, when the G-line is depicted in response to the test signal 8G, two pulses (signal S2) having an interval time Tvg are detected by photoelectric conversion element 21 in response to the crossing of the G-line over index phosphor 6. These two pulses are used for generating a gate pulse (signal S2′) from photoelectric conversion element 21. During the generation of the gate pulse (signal S2′), time-voltage converter 22 integrates a constant signal to produce a voltage Vvg indicative of the interval time Tvg.

Also, when the B-line is depicted in response to the test signal 8B, two pulses (signal S3) having an interval time Tvb are detected, which are used for generating a gate pulse (signal S3′). During the generation of the gate pulse (signal S3′), time-voltage converter 22 integrates a constant signal to produce a voltage Vvb indicative of the interval time Tvb.

Figure 7A:
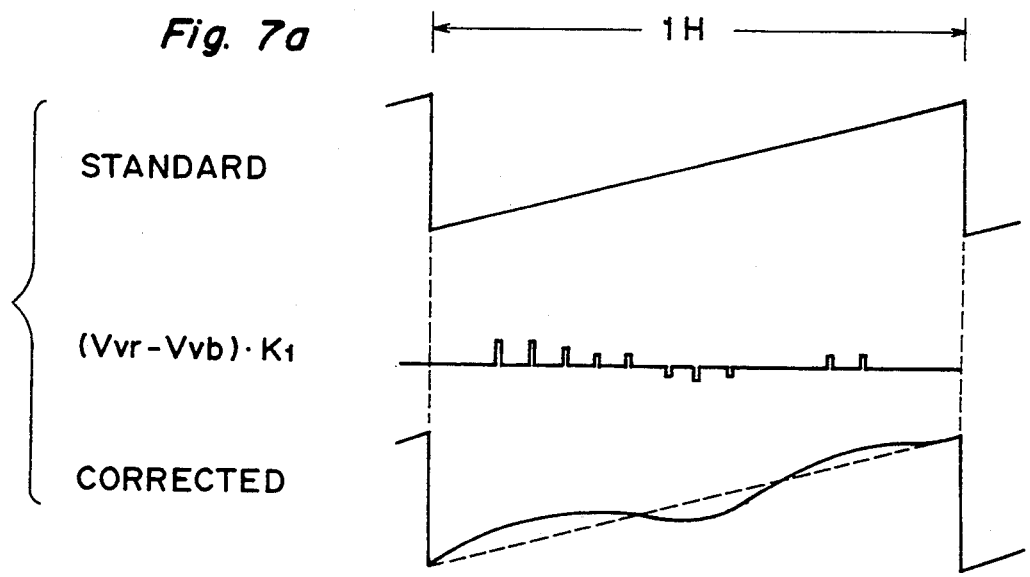
FIGS. 7a, 7b, 7c and 7d are graphs showing steps to correct the standard waveforms to corrected waveforms.

Then, in measuring circuit 23, a voltage difference Vvr−Vvb is calculated. In this manner, the voltage differences at various sampling points where the index phosphors 6 are located are obtained and sent to calculator 120. At calculator 120, the calculated differences are used for modifying the standard waveform stored in reference generator 10a. More specifically, as shown in FIG. 7a, the calculated difference is multiplied by a predetermined coefficient K1 and is added to the standard waveform as stored in reference generator 10a. The obtained corrected waveform is stored in memory 27a.

Then, the corrected waveform stored in memory 27a is taken out through switch SW1 and the medians between the sampling points are compensated at interpolation circuit 28. The obtained data is processed in the D/A converter and LPF 30 and applied through switch SW2 to coils C1–C4 in FIG. 3a to move the R-beam downwards and B-beam upwards, or vice versa. Thus, in the next cycle, i.e., when the test signal 8R and 8B are applied for the second time, the R-line will be shifted down and the B-line will be shifted up as shown by dotted lines in FIG. 6a so that the R-line and B-line will be in the same horizontal level, but still offset in horizontal direction.

Figure 6B:
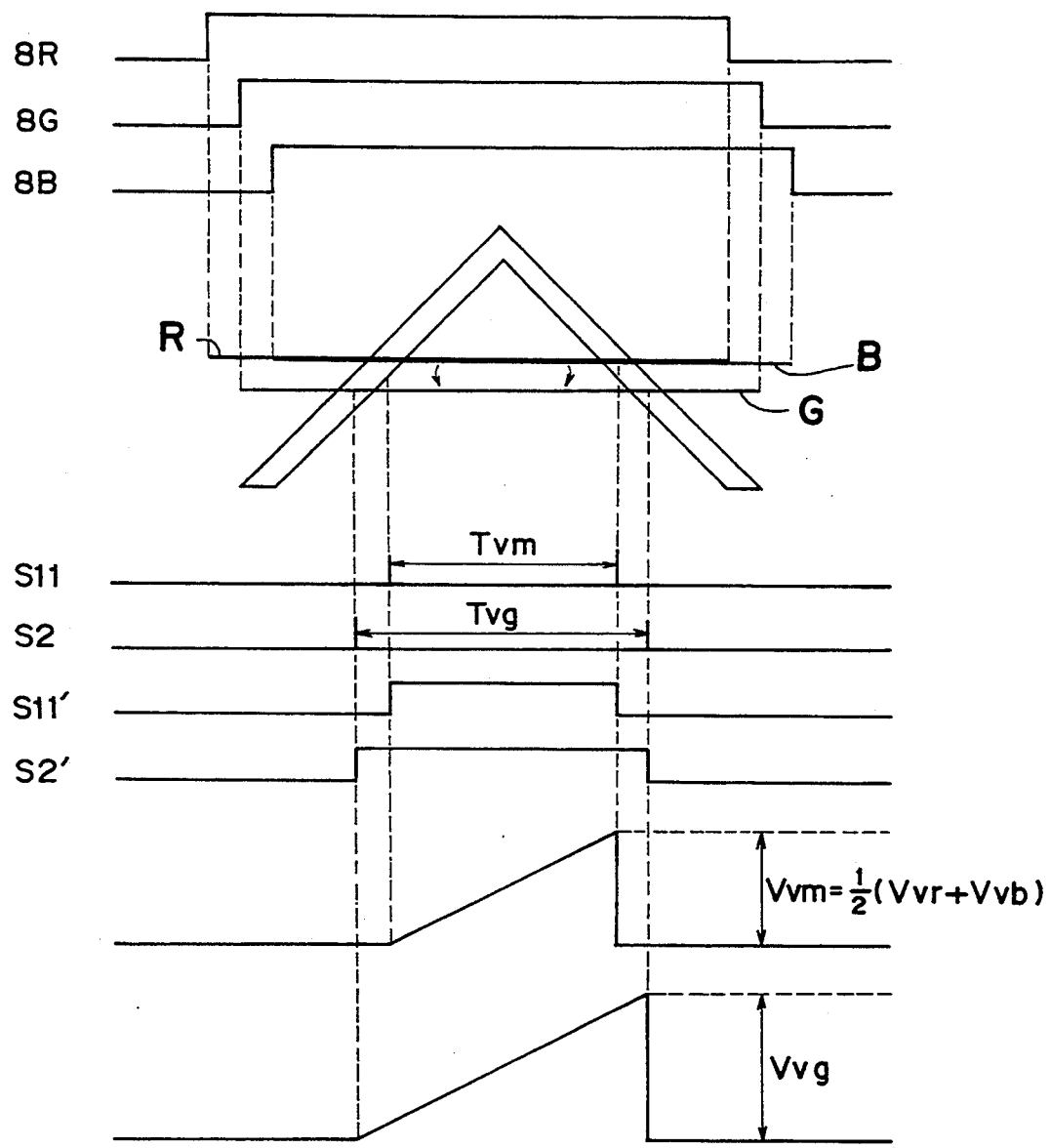

The second step is explained in connection with FIG. 6b. In FIG. 6b, red, green and blue test signals 8R, 8G and 8B are applied one after another separately, so that R-, G- and B-lines are produced on the shadow mask 4 over one index phosphor 6. Since the R and B beams are adjusted as in the same horizontal level, both R- and B-lines cross the same position in the index phosphor 6.

When the R- or B- line is depicted in response to the test signal 8R or 8B, two pulses (signal S11) having interval time Tvm are detected by photoelectric conversion element 21. These two pulses are used for generating a gate pulse (signal S11′) from photoelectric conversion element 21. During the generation of the gate pulse (signal S11′), time-voltage converter 22 integrates a constant signal to produce a voltage Vvm indicative of the interval time Tvm. Since R- and B-lines shown in FIG. 6b are located at the center of R- and and B-lines shown in FIG. 6a, $Vvm = \frac{1}{2}(Vvr + Vvb)$ is obtained.

When the G-line is depicted in response to the test signal 8G, two pulses (signal S2) having an interval time Tvg are detected by photoelectric conversion element 21 in response to the crossing of the G-line over index phosphor 6. These two pulses are used for generating a gate pulse (signal S2′) from photoelectric conversion element 21. During the generation of the gate pulse (signal S2′), time-voltage converter 22 integrates a constant signal to produce a voltage Vvg indicative of the interval time Tvg.

Figure 7B:
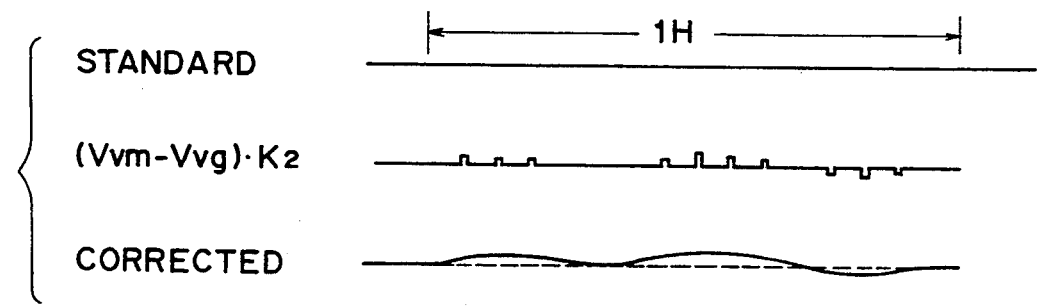

Then, in measuring circuit 23, a voltage difference Vvm−Vvg is calculated. In this manner, the voltage differences at various sampling points where the index phosphors 6 are located are obtained and sent to calculator 120. At calculator 120, the calculated differences are used for modifying the standard waveform stored in reference generator 10b. More specifically, as shown in FIG. 7b, the calculated difference is multiplied by a predetermined coefficient K2 and is added to the standard waveform as stored in reference generator 10b. The obtained corrected waveform is stored in memory 27b.

Figure 6C:
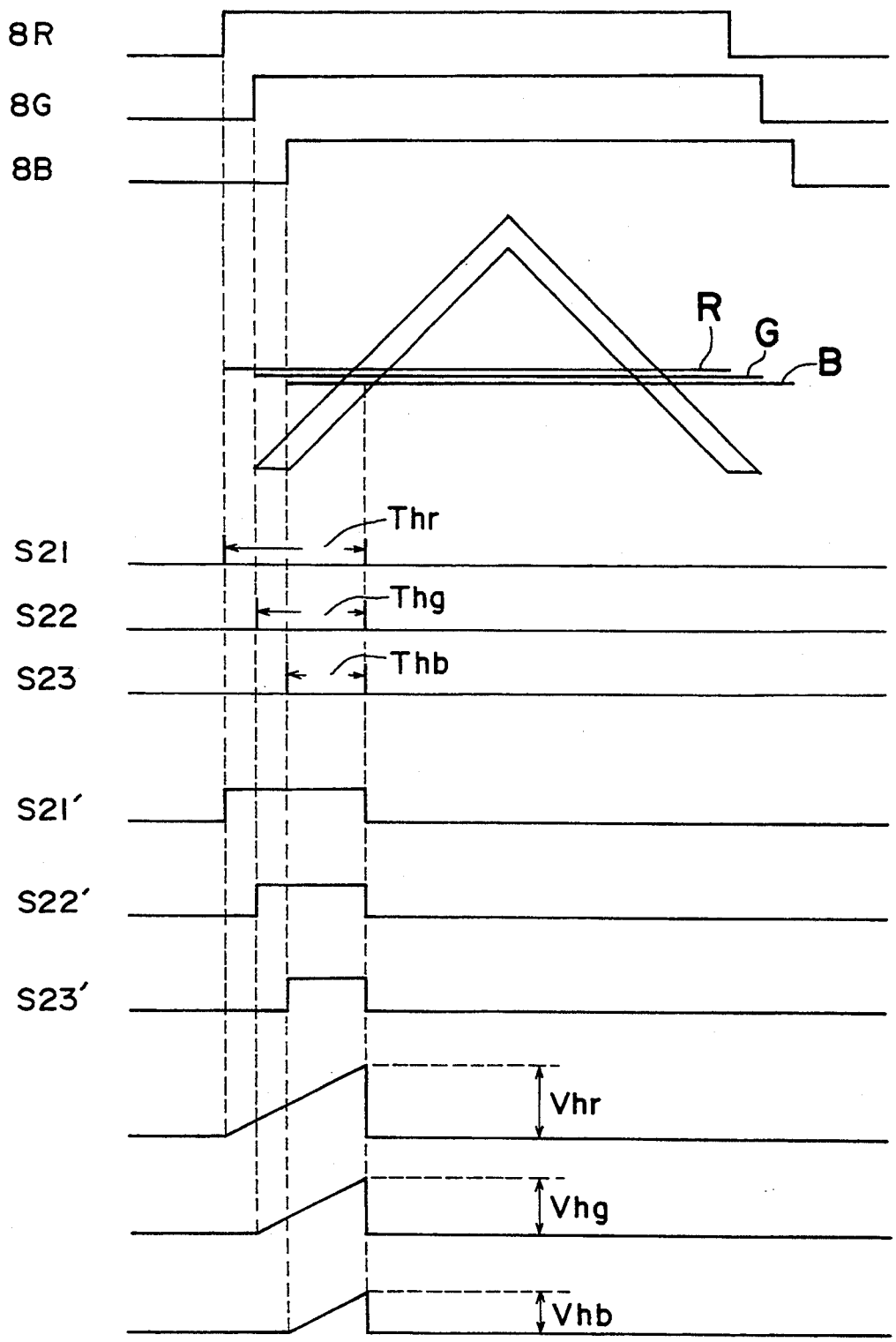

Then, the corrected waveform stored in memory 27b is taken out through switch SW1 and the medians between the sampling points are compensated at interpolation circuit 28. The obtained data is processed in the D/A converter and LPF 30 and applied through switch SW2 to coils C5 and C6 in FIG. 3b to move both the R- and B-beams downwards or upwards. Thus, in the next cycle, i.e., when the test signal 8R and 8B are applied for the third time, the R- and B-lines will be shifted together so that the R-, B- and G-lines will be in the same horizontal level, but still offset in horizontal direction, as shown in FIG. 6c.

The third and fourth steps are explained in connection with FIG. 6c. In FIG. 6c, red, green and blue test signals 8R, 8G and 8B are applied one after another separately, so that R-, G- and B-lines are produced in the same horizontal level on the shadow mask 4 over one index phosphor 6.

When the R-line is depicted in response to the test signal 8R, two pulses (signal S21), one obtained at the leading edge of the test signal 8R and another obtained at the first crossing point with respect to the index phosphor 6 and having an interval time Thr are detected by photoelectric conversion element 21. These two pulses are used for generating a gate pulse (signal S21′) from photoelectric conversion element 21. During the generation of the gate pulse (signal S21′), time-voltage converter 22 integrates a constant signal to produce a voltage Vhr indicative of the interval time Thr.

Similarly, for the G-line, two pulses (signal S22) having an interval time Thg are detected, and a gate pulse (signal S22′) is generated. Also, a voltage Vhg indicative of the interval time Thg is generated.

Also, for the B-line, two pulses (signal S23) having an interval time Thb are detected, and a gate pulse (signal S23′) is generated. Also, a voltage Vhb indicative of the interval time Thb is generated.

Figure 7C:
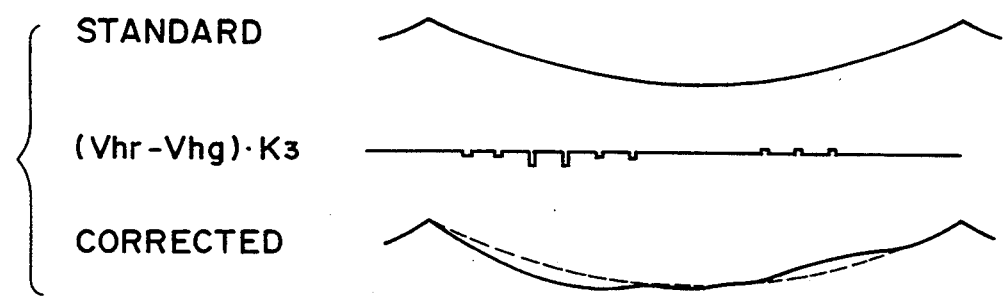
Figure 7D:
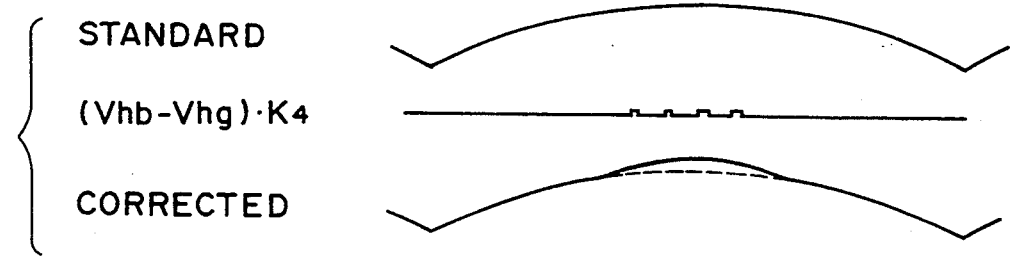

Then, in measuring circuit 23, voltage differences Vhr−Vhg and Vhb−Vhg are calculated. In this manner, the voltage differences at various sampling points where the index phosphors 6 are located are obtained and sent to calculator 120. At calculator 120, the calculated differences are used for modifying the standard waveform stored in reference generators 10c and 10d. More specifically, as shown in FIGS. 7c and 7d, the calculated differences Vhr−Vhg and Vhb−Vhg are respectively multiplied by predetermined coefficients K2 and K3 and are added to the standard waveforms as stored in reference generators 10c and 10d. The obtained corrected waveforms are stored in memories 27c and 27d, respectively.

Then, the corrected waveform stored in memory 27c is taken out through switch SW1 and the medians between the sampling points are compensated at interpolation circuit 28. The obtained data is processed in the D/A converter and LPF and applied through switch SW2 to coils C7 and C8 in FIG. 3c to move the R-beam leftward.

Thereafter, the corrected waveform stored in memory 27d is taken out through switch SW1 and the medians between the sampling points are compensated at interpolation circuit 28. The obtained data is processed in the D/A converter and LPF 30 and applied through switch SW2 to coils C9 and C10 in FIG. 3c to move the B-beam rightward.

Thus, in the next cycle, i.e., when the test signal 8R and 8B are applied for the fourth time, the R- and B-lines will be shifted horizontally so that the R-, B- and G-lines will all be in the same position one over the other.

The generation of the test signal is described in further detail below with reference to the screen image shown in FIG. 8a which shows test signals 32. In a CRT in which the index phosphors 6 are coated to the shadow mask as shown in FIG. 2, the test signal used to detect any shift in the horizontal and vertical position is shown in FIG. 8a. In each detection direction, the test signal scans from left to right and is sequentially shifted. A test signal for each direction (FIG. 8a) is set for each of the plural index phosphors 6 shown in FIG. 2, and each position is detected.

In addition, the angle of the diagonal slits in each index phosphor 6 is preferable at 45° due to the need to detect both horizontal and vertical directions, but considering the amount of correction required more in the horizontal direction than in the vertical direction, it is more preferable to make the angle between the slits less than 45°. In addition, each possible shape for the index phosphor is defined by two members at an angle to the main scanning direction as shown in FIGS. 8b–8i.

Figure 9:
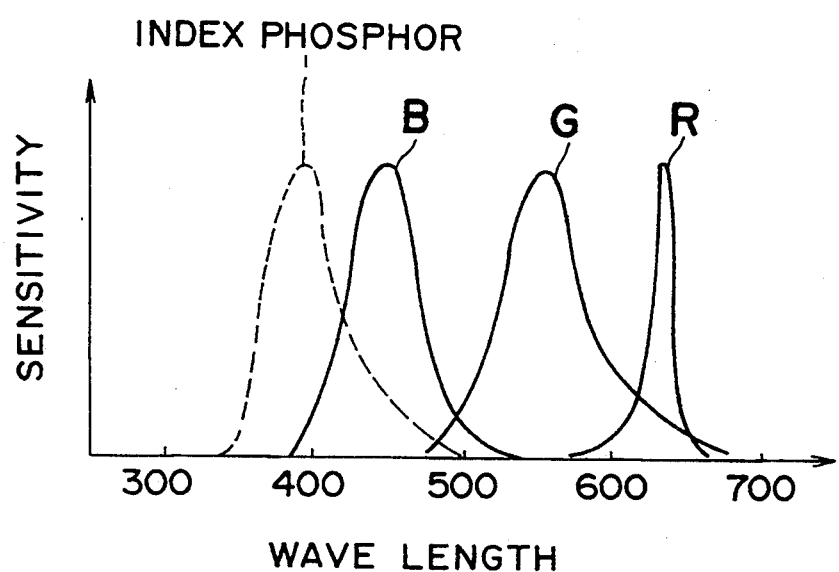
FIG. 9 is a graph of the spectral characteristics of the index phosphor of the invention.

FIG. 9 shows the spectral characteristics of each color and the index phosphors. An ultraviolet range phosphor (e.g., P47) is used for the index phosphors 6 so that the index phosphors 6 are not affected by the RGB light, and a photomultiplier tube is used for the photoelectric conversion elements.

As described above, a simply constructed cathode ray tube with an index phosphor coating enabling precise detection by the detection means of the two-dimensional position of the electron beam can be achieved by arraying index phosphors comprising two members diagonal to the main scanning direction of the electron beam at known positions on the shadow mask surface to generate feedback signals dependent upon the electron beam scan. In addition, the structure of this cathode ray tube can be further simplified and improved compatibility with various convergence correction points can be achieved by using a coating of index phosphors comprising continuous diagonal linear elements. It is further possible to achieve stable, high precision correction by providing plural adjustment points on the screen and generating the corrected waveform using data interpolation between the adjustment points.

The second embodiment of the invention is described below with reference to FIGS. 10-17. The second embodiment differs from the first in the additional correction of correction error caused by a shift between the position of the shadow mask, which is the CRT detection surface, and the phosphor plane, which is the actual display screen.

Figure 10:
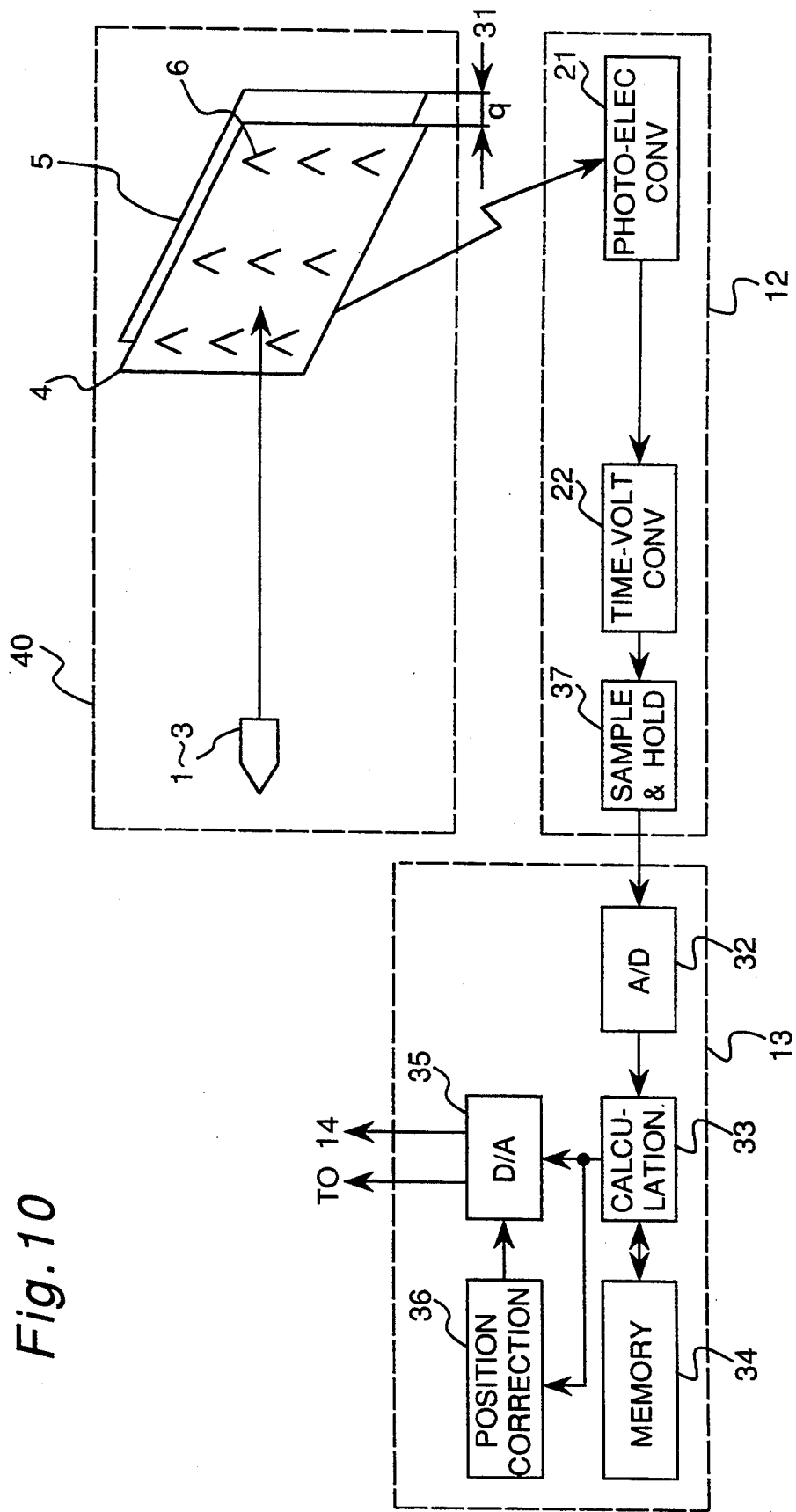
FIG. 10 is a block diagram of a cathode ray tube control apparatus according to the second embodiment of the invention.

Referring to FIG. 10, the second embodiment references the position offset 31 between the shadow mask 4 surface, on which is coated the array of index phosphors 6 of two diagonal shapes and which is the detection surface, and the phosphor screen 5, which is the display surface. This embodiment further comprises a photoelectric conversion element 21, a time-voltage converter 22, a sample and hold circuit 37, an A/D converter (ADC) 32, a calculation circuit 33, a memory device 34, a position offset correction circuit 36, and a D/A converter (DAC) 35.

The photoelectric conversion element 21 detects the index area and performs a photoelectric conversion, and is distributed across the shadow mask area corresponding to the full display area of the CRT 40. The time-voltage converter 22 converts the time axis expressing the offset of the index signal to a voltage value. The sample and hold circuit 37 samples the time-voltage converted signals, and holds the highest signal peak. The ADC 32 converts the analog signal held by the sample and hold-circuit 37 to a digital signal, which is then referenced by the calculation circuit 33 for data comparisons and to obtain the correction error. The correction data computed by the calculation circuit 33 is stored by the memory device 34. The position offset correction circuit 36 corrects the offset between the display screen and the detection surface at each display position. The DAC 35 converts the digital correction data fetched from the memory device 34 to an analog signal, and outputs the converted analog signal to the deflection circuit 14.

Figure 11:
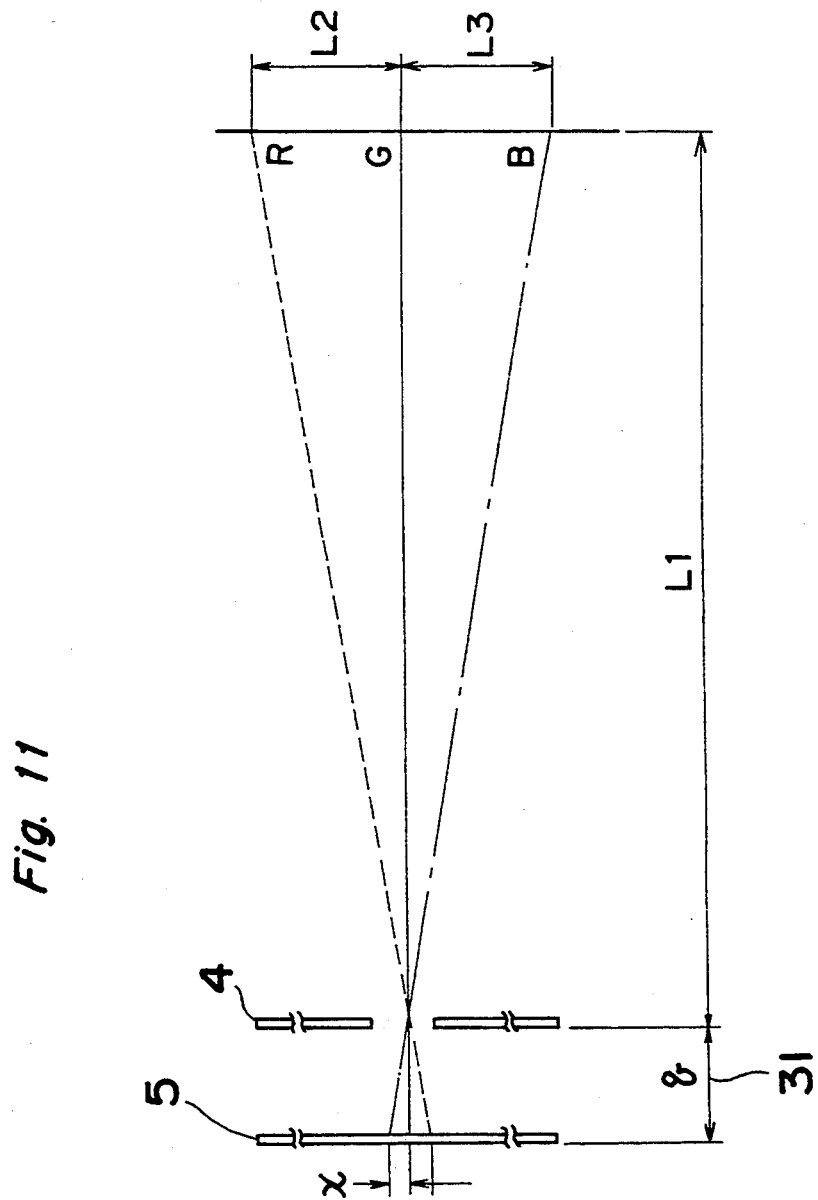
FIG. 11 is a diagram of a CRT used to describe the principle explaining misconvergence in the second embodiment.
Figure 12:
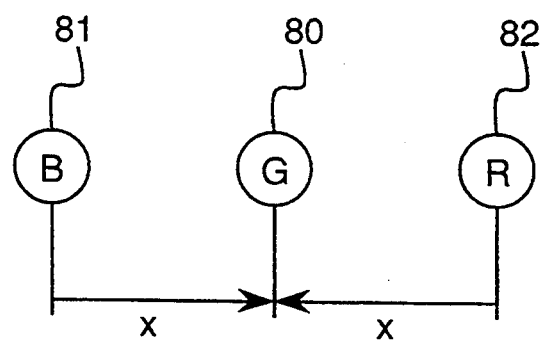
FIG. 12 is a diagram showing three beam spots on a phosphor screen before correction.
Figure 13:
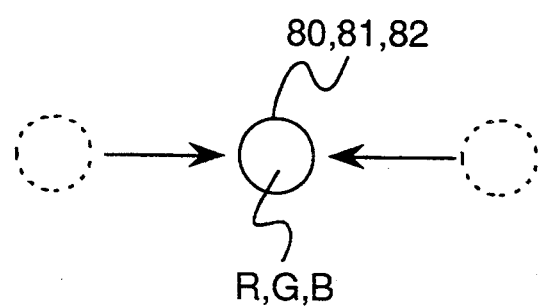
FIG. 13 is a diagram showing three beam spots on a phosphor screen after correction.

The second embodiment of the cathode ray tube control apparatus according to the invention is described in detail below using FIGS. 10-12. As shown by the relationship between the detection and display surfaces in FIG. 10, there is usually a gap between the phosphor screen 5 and the shadow mask 4. This gap is known as the detection—display surface distance 31, commonly expressed as "q" in CRT jargon. The cause of misconvergence due to the surface distance (q) 31 is described below with reference to FIG. 11.

Several spatial factors, i.e., distances L2 and L3 between the main lenses of the RGB electron guns, distance L1 from the main lens to the shadow mask 4 surface, and the surface distance (q) 31, contribute to the occurrence of misconvergence x at the phosphor screen 5. The misconvergence can be calculated from the specifications of the cathode ray tube. Common CRT specifications are substituted for these values in the following computation. 10 Using the values L1=532 mm, L2=L3=7 mm, and q=14 mm, a misconvergence of x≈0.4 mm can be calculated. In HDTV and other high resolution displays, this is an unacceptably high misconvergence level. FIG. 12 shows the offset and direction of misconvergence. In an in-line CRT device, the R and B signals are positioned relative to a middle G signal. To correct the detection error of the surface distance (q) 31, correction data is generated by the position offset correction circuit 36. This correction data is supplied to the DAC 35, the focus correction data from the memory device 34 is added, and the final correction data is generated. By applying this correction data, the misconvergence-free state shown in FIG. 13 can be achieved. The amount of correction error due to the offset between the display and detection surfaces are previously stored in ROM 34 because the correction data output from the position offset correction circuit 36 can be determined by the CRT specifications. In addition, because the surface distance (q) 31 typically increases from the center to the edge of the screen, the generated correction data enables greater correction towards the edges.

In operation, the offset amounts are detected in the same manner as explained above in connection with FIGS. 6a–7c.

These signals representing the offset amount in each direction as a voltage value are supplied to the sample and hold circuit 37, which samples and holds the signals at the timing of the peak voltage of each wave, which is then converted to a digital signal by the ADC 32. It is to be noted that the sample and hold circuit 37 corresponds to the measuring circuit 23, calculation circuit 33 corresponds to calculation circuit 120, memory 34 corresponds to memories 27a–27d. Thus, when compared with the first embodiment, the second embodiment is further provided with a position offset correction circuit 36.

The calculation circuit 33 calculates the correction direction and amount required to coincide the voltages, e.g., Vvr and Vvb, and outputs the resulting correction data to the memory device 34. The correction data output from the memory device 34 for converging the R and B beams to the G beam, and the correction data from the position offset correction circuit 36 for correcting the detection error in the surface distance (q) 31 are supplied to the DAC 35, which adds the convergence correction data and the detection error correction data to generate the final correction data. This correction data is converted by the DAC 35 to the analog signal supplied to the deflection circuit 14, which corrects the convergence and geometry accordingly.

Figure 14:
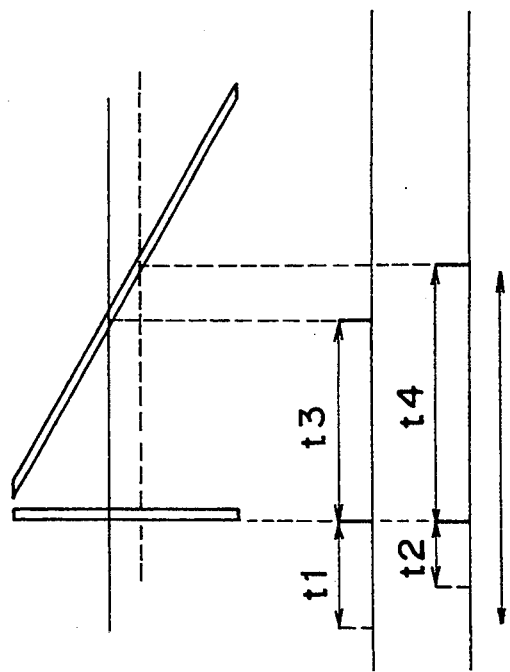
FIG. 14 is a diagram of a index phosphor according to the prior art.
Figure 15A:
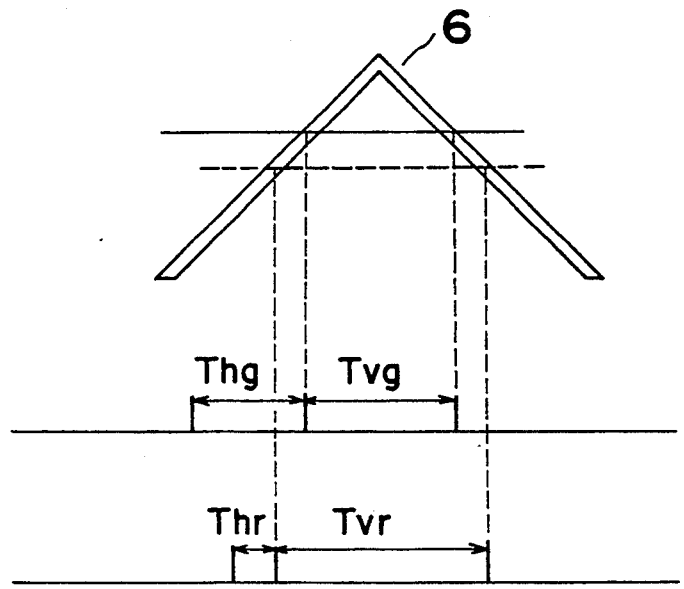
FIG. 15a is a diagram showing the relationship between the screen and waveforms used to describe the operation of the second embodiment of the invention.

The shape and detection method of the index phosphor is described next using FIGS. 14 and 15. FIG. 14 shows prior art index phosphor which employs the lambda-like configuration, and FIG. 15(a) shows the index phosphor 6 according to the present invention. As described in the first embodiment above, the shape according to the present invention enables precise detection of the test signal position by the index phosphors. In the prior art method shown in FIG. 14, a horizontal test signal is projected to the lambda-shaped index phosphors and an index signal is detected. Each direction can be detected from the timing of the detection signal.

In the cathode ray tube control apparatus of the invention as shown in FIG. 15a, a horizontal test signal is sequentially projected to the index phosphors of two diagonal members and the index signals are detected according to the correction direction, thus enabling detection in each direction according to the detection signal and correction mode.

The operation of the prior art is described first below.

The index phosphor and test signal on the screen are shown in FIG. 14. The G test signal (real line) is detected by the index phosphor to obtain time data t1 and t3. The R test signal (dotted line) is detected by the index phosphor to obtain time data t2 and t4. The correction amount in the horizontal direction is detected from the first index signal output from the first index phosphor at the intersection perpendicular to the test signal, and the correction amount in the vertical direction is detected from the second index signal output from the second index phosphor diagonally intersecting the test signal.

In the index signals shown in FIG. 14, times t1 and t2 correspond to the horizontal direction, and t3 and t4 to the vertical direction. For horizontal convergence the horizontal R convergence is corrected so that t1=t2, and for vertical convergence the vertical R convergence is corrected so that t3=t4. A detection range from the test signal rise to the end of the second index phosphor is therefore required.

The present embodiment is described next.

The index phosphor and test signals on the screen are shown in FIG. 15(a). The G test signal (real line) is detected by the index phosphor to obtain time data Thg and Tvg. The R test signal (dotted line) is detected by the index phosphor to obtain time data Thr and Thg.

In the apparatus of the invention, the required vertical correction is detected from the first and second index signals, which are output from the first and second index phosphors, respectively, diagonally intersecting the test signals, and the horizontal correction is detected from the test signal and the first index signal output from the first index phosphor.

In the index signals shown in FIG. 15a, a detection range equal to the area inside the diagonal index phosphors is required.

Figure 15B:
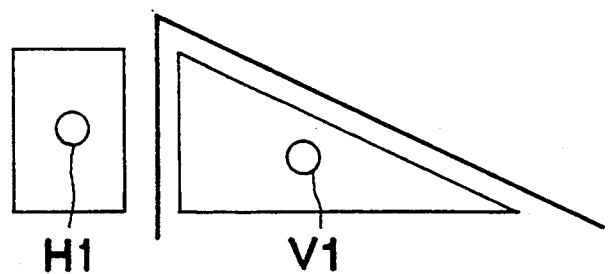
FIG. 15b is a diagram showing arrangement of index phosphor according to the prior art.
Figure 15C:
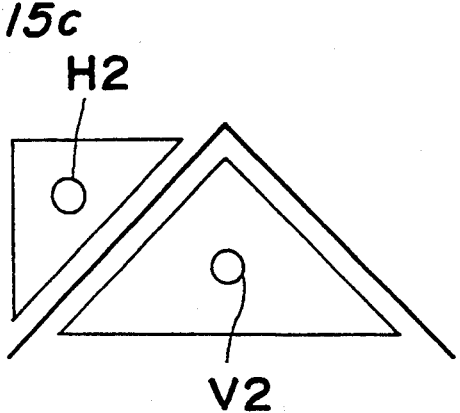
FIG. 15c is a diagram showing arrangement of index phosphor according to the present invention.

The range and weighted center of the detection area in the above two methods are shown in FIG. 15b for the prior art and FIG. 15c for the present invention. While the horizontal center H1 and vertical center V1 of the prior art method shown in FIG. 15b are widely separated, the horizontal center H2 and vertical center V2 of the method of the invention are relatively close, making high precision correction possible.

Thus, the detection area of the present invention can be set to a narrow range compared with that of the prior art, and high precision position detection is possible because the centers of the detection areas are relatively close.

Figure 16A:
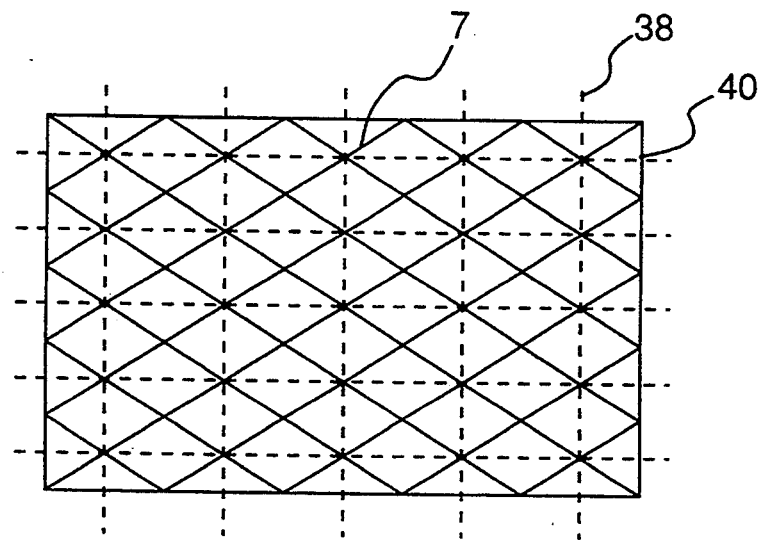
FIGS. 16a and 16b are screen image diagrams used to describe the operation of the second embodiment of the invention.
Figure 16B:
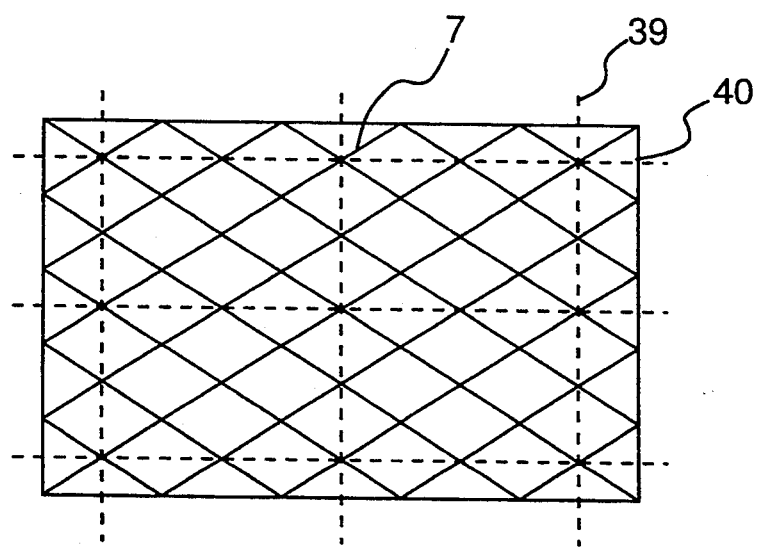

FIGS. 16a and 16b are used below to describe why detection and setting the correction range are simplified by using index phosphors of continuous diagonal line elements. FIGS. 16a and 16b show the screen when the test signal is projected to the continuous index phosphors 7 coated on the shadow mask of the CRT 40. When a fine hatch signal is emitted as the test signal 38 as shown in FIG. 16a, the correction point grid has 25 correction points with five adjustment and detection points on each vertical and horizontal axis. The detection and measurement methods are as described above, and further description is omitted below. When a coarse hatch signal is emitted as the test signal 39 as shown in FIG. 16b, the correction point grid has 9 correction points with three adjustment and detection points on each vertical and horizontal axis. By thus changing the test signal generation timing, the number and location of the correction points can be easily adjusted. It is to be noted that a hatch signal is used for the test signal only so that the location of the correction points can be easily understood, but the actual convergence test signal will obviously be a horizontal bar signal.

FIG. 17, in which the relationship between the corrected waveform and the resulting on-screen changes is shown, is used to describe the method of generating the corrected waveform based on the detection signals from the center axis and periphery of the screen as shown in FIG. 16b. When the corrected waveform is a vertical sawtooth wave with a 1 V (vertical scanning) period as shown in box (1) in FIG. 17, vertical amplitude correction will be applied when the corrected waveform is applied to the vertical convergence coil, and orthogonal correction of vertical lines will be applied when the corrected waveform is applied to the horizontal convergence coil.

When the corrected waveform is a horizontal parabolic wave with a 1H (horizontal scanning) period as shown in box (4) in FIG. 17, correction of horizontal line curvature will be applied when the corrected waveform is applied to the vertical convergence coil, and horizontal linearity correction will be applied when the corrected waveform is applied to the horizontal convergence coil.

As shown in FIG. 17, the corrected waveform can be essentially classified as either a sawtooth wave or a parabolic wave. As a result, the offset and direction are obtained from the detection signals from the periphery and center axis of the screen to generate the corrected waveform for automatic correction of convergence and geometric distortion.

It is therefore possible to achieve high precision correction of convergence and geometric distortion with the present invention by compensating for correction error caused by the offset between the shadow mask, which is the CRT detection surface, and the phosphor display surface.

The third embodiment of the invention is described below with reference to FIGS. 18 and 19. This embodiment differs from the first in that the correction is based on the signal width of the detection signal from the shadow mask of the CRT.

Figure 18A:
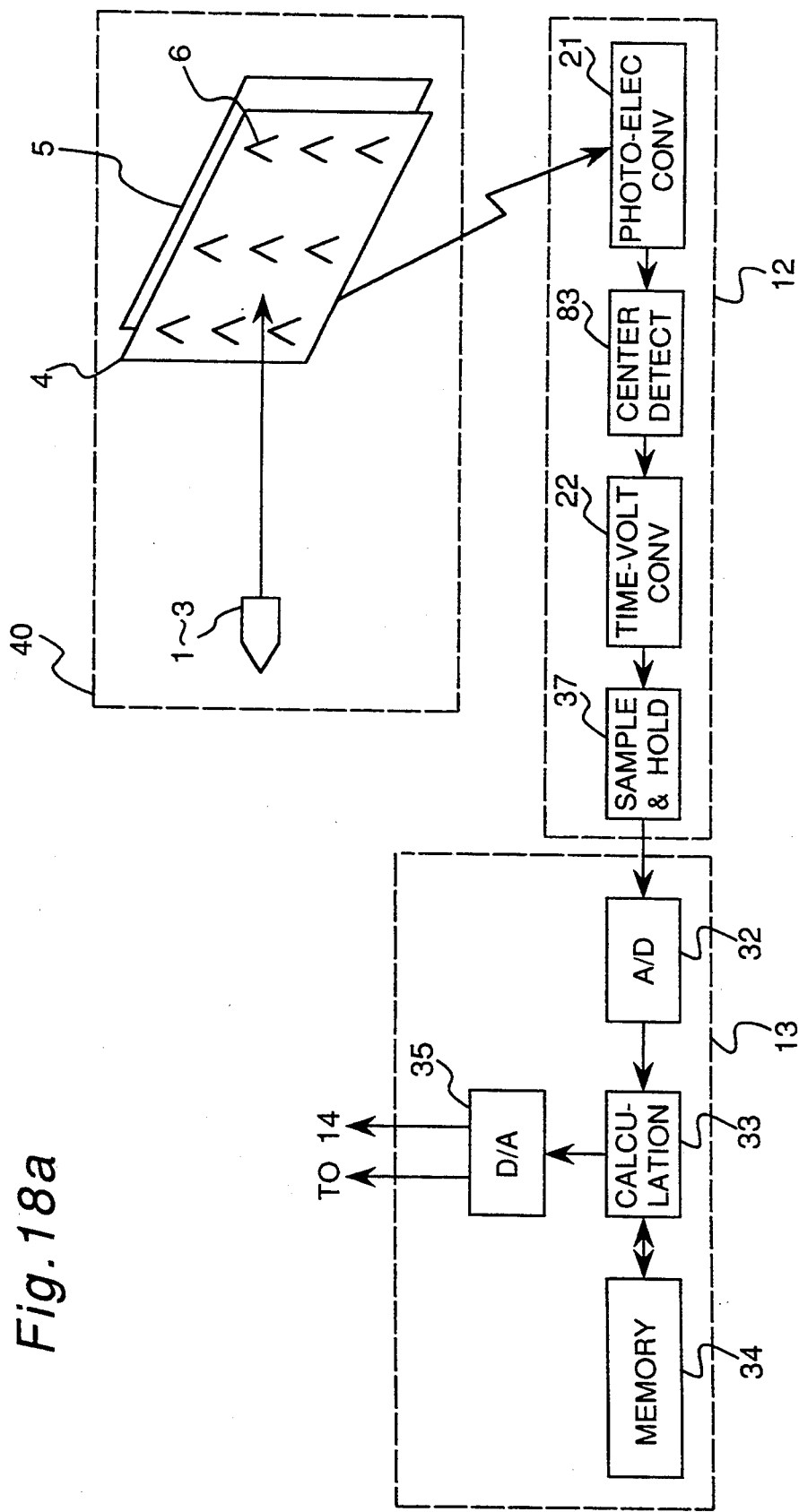
FIG. 18a is a block diagram of an image correction apparatus according to the third embodiment of the invention.

Referring to FIG. 18a, this third embodiment additionally comprises a center position detection circuit 83 for detecting the center position of the signal width in order to detect the signal width of the photoelectric conversion signal output from the photoelectric conversion element 21. Note that like components in the second and third embodiments are identified by like references in FIG. 18a, and further description of said like components is omitted below.

Figure 18B:
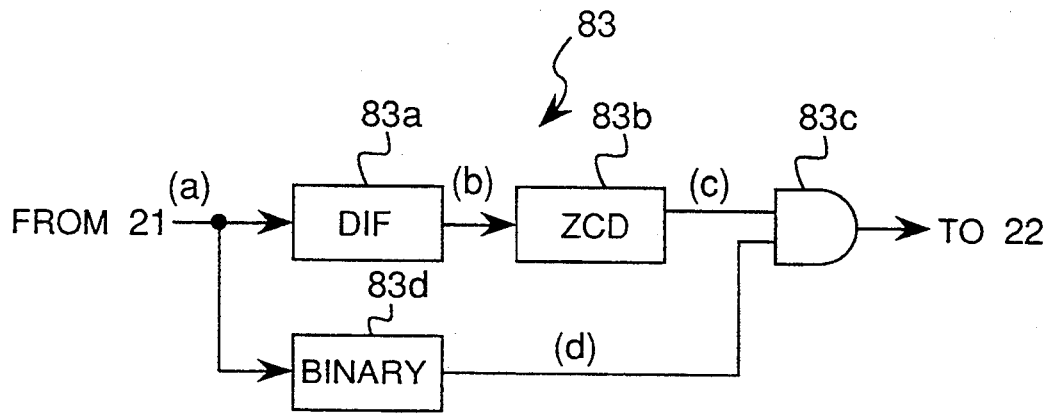
FIG. 18b is a block diagram of a center detector shown in FIG. 18a, FIG. 18c is a graph showing signals obtained from the circuit of FIG. 18b.
Figure 18C:
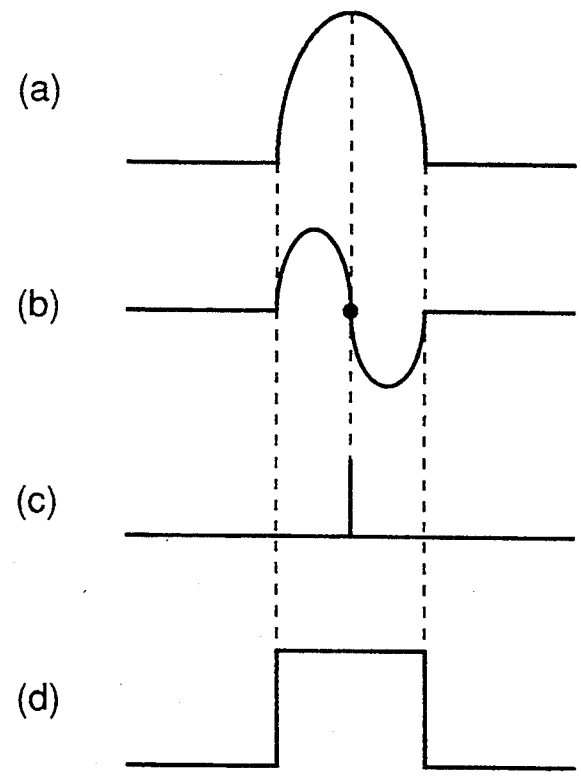

As shown in FIG. 18b, the center position detection circuit 83 includes a differential circuit 83a for producing a differential value (FIG. 18b(b)) of the input signal (FIG. 18b(a)), a zero cross point detector 83b for detecting a zero crossing point of the differentiated signal and for producing a pulse (FIG. 18(c)) in response to the detection of the zero crossing point, a binary circuit 83d for making a binary signal (FIG. 18(d)) from the input signal (FIG. 18(a)), and a gate circuit 83c for taking a logic AND between the two input signals to produce the pulse (FIG. 18(c)) representing the zero crossing point. Thus, the center position detection circuit 83 detects a center position of a portion of the index phosphor 6 where the beam intersects.

Figure 19:
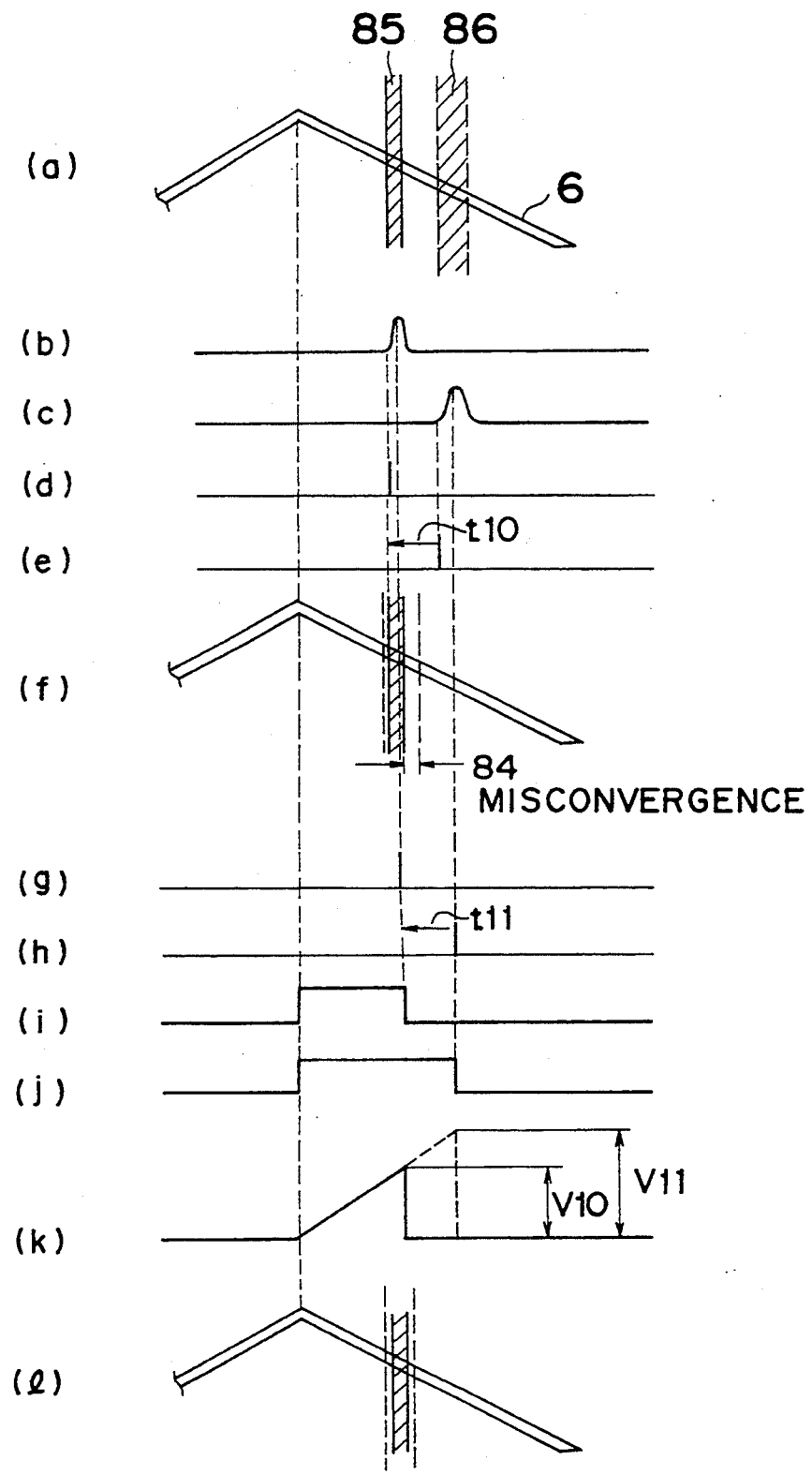
FIG. 19 is a diagram showing waveforms used to describe the operation of the third embodiment of the invention.

The screen images and waveform diagrams in FIG. 19 are used to further describe the cathode ray tube control apparatus according to the third embodiment below. Referring to FIG. 19(a), when test signals 85 and 86 with different signal widths are emitted to the index phosphor 6, the photoelectric conversion signals output from the photoelectric conversion element 21 will be analog signals of different signal widths as shown in FIG. 19(b) and (c). If these signals are digitized at the signal rise point, the digital signals as shown in FIG. 19(d) and (e) are obtained. If convergence is then based on these digitized signals, convergence during the test signal ramp-up period will be correct, but misconvergence 84 will still occur due to the different signal widths.

By placing the index phosphors of the present embodiment at an angle to the test signal, detecting the signal widths of the two test signals, a vertical bar signal and horizontal bar signal, and detecting the center position of the signal, high precision measurement and correction can be achieved even when the signal widths differ due to aberrations or the spot characteristics of the test signals. The photoelectric conversion signals (FIG. 19(b), (c)) output from the photoelectric conversion element 21 are thus input to the center position detection circuit 83 for detecting the center of the analog signal width, and the digital signals shown in FIG. 19(g) and (h) are output to the time-voltage converter 22.

The time-voltage converter 22 thus generates gate signals for comparison with the reference signals shown in FIG. 19(i) and (j), and generates the ramp signal shown in FIG. 19 (k) during the gate signal period. The ramp signal output from the time-voltage converter 22 is supplied to the sample and hold circuit 37, which samples and holds the peak voltage. As a result, peak voltages V10 and V11 are output from the sample and hold circuit 37 when the test signals 85 and 85 (FIG. 19(a)) are detected by the index phosphor 6, respectively. By correcting the convergence of the test signal 86 so that the peak voltages are equal (V10=V11), high precision correction is possible as shown in FIG. 19(l) even when the signal widths of the test signals are different.

The cathode ray tube control apparatus of the third embodiment can thus compensate for correction error due to the beam spot size or aberrations, and can thus provide even higher precision correction,.by obtaining the two-dimensional position of the electron beam from the signal widths and the feedback signal of the electron beam from the shadow mask, and correcting the deflection distortion of the electron beam according to the two-dimensional position signal. It is further possible to simplify the construction of the cathode ray tube and achieve compatibility with a variable number of convergence correction points by using a detection means that is diagonal to the main scanning direction of the electron beam.

The fourth embodiment of the invention is described below with reference to FIGS. 20 and 21. This embodiment differs from the first in that a sequential scanning detection test signal is emitted and the two-dimensional position is detected dynamically during the correction process.

Figure 20:
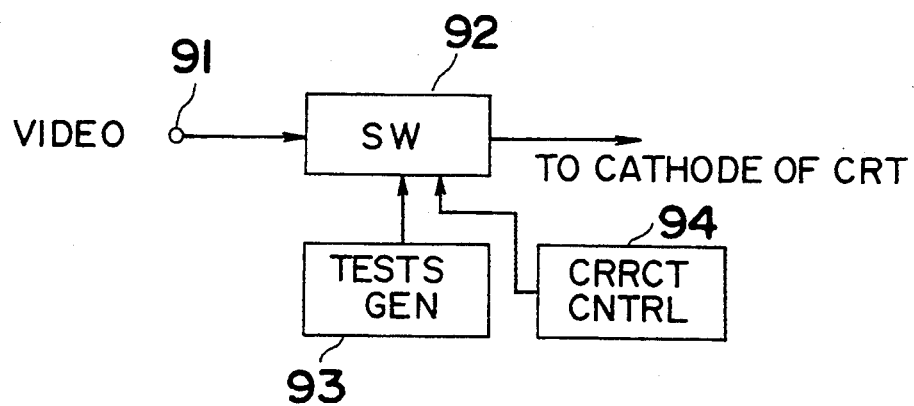
FIG. 20 is a block diagram of an image correction apparatus according to the fourth embodiment of the invention.

Referring to FIG. 20, this fourth embodiment additionally comprises a sequential scan test signal generating circuit 93 for generating the sequential scan test signals, a signal switching circuit 92 for switching between the line video signal input from the input terminal 91 and the test signal output from the sequential scan test signal generating circuit 93, and a correction operation controller 94 for controlling the convergence correction operation. Note that like components in the second and fourth embodiments are identified by like references in FIG. 20, and further description of said like components is omitted below. The sequential scan test signal generating circuit 93 produces no-interlace signal so that the horizontal scanning lines during the even field and those during the odd field are the same. In other words, the R, G and B electron gun are so driven to scan in no-interlaced manner. By the use of sequential scan test signal generating circuit 93, the same evaluation can be made from both the even field and the odd field. A detail of no-interlace circuit for producing the no-interlace signal used in the sequential scan test signal generating circuit 93 is disclosed in U.S. Pat. No. 4,414,571 to T. Kureha, which is incorporated herein by reference.

Figure 21A:
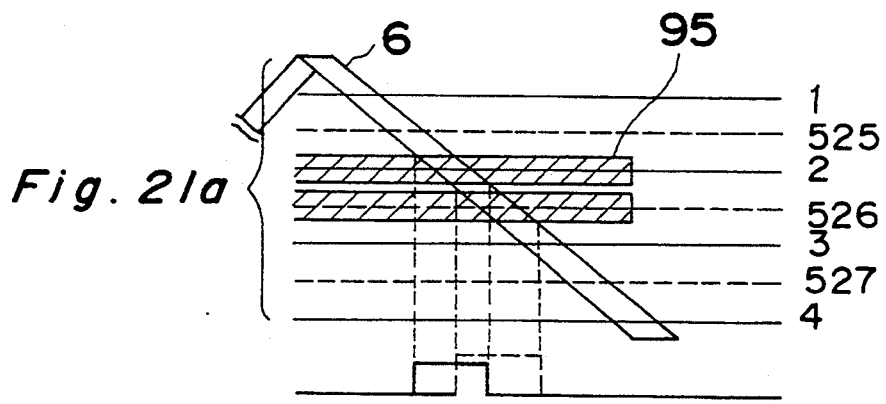
FIGS. 21a and 21b are diagrams showing waveforms used to describe the operation of the fourth embodiment of the invention.
Figure 21B:
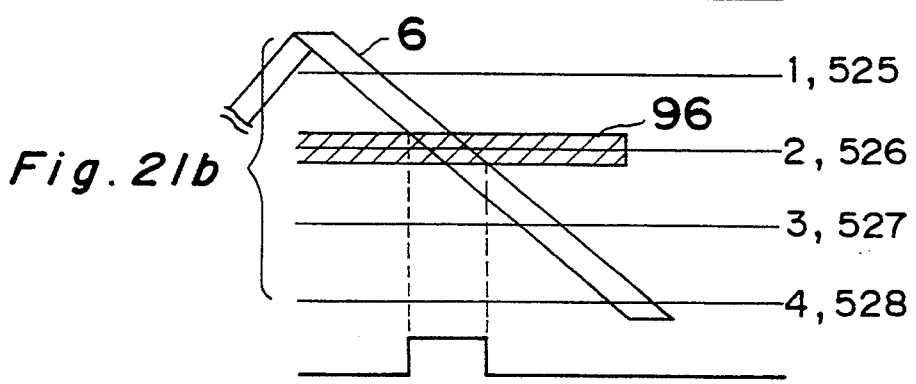

The screen images and waveformdiagrams in FIGS. 21a and 21b are used to further describe the cathode ray tube control apparatus according to this embodiment below. Referring to FIG. 21a, when an interlace scanning test signal is emitted to the index phosphor 6 and the vertical offset is calculated, the first field scanning line (solid line) and the second field scanning line (dotted line) scan different lines, and the digitized waveform of the photoelectric conversion signals output from the photoelectric conversion element 21 will have a different timing between the fields. As a result, high precision position measurement is not possible.

In the present embodiment, as shown in FIG. 21b, the test signal from the sequential scan test signal generating circuit 93 is selected by the signal switching circuit 92 based on the control signal from the correction operation controller 94 to project the sequential scan test signals to the screen only during the correction operation. As a result, the digitized waveform of the photoelectric conversion signal from the photoelectric conversion element 21 is output with the same timing between fields as shown in FIG. 21b. In other words, according to this embodiment, since the 2n-1 and 2n horizontal lines are scanned in the same line only for the test purpose, the test signal scans the same line.

The cathode ray tube control apparatus according to the fourth embodiment can thus achieve high precision correction because stable, high precision position measurement is made possible by sequentially outputting a sequential scan detection test signal to the detection means, obtaining the two-dimensional position of the signal, and controlling the deflection means according to this signal to correct the deflection distortion of the electron beam.

The fifth embodiment of the invention is described below with reference to FIGS. 22, 23a and 23b. This embodiment differs from the first in evaluating output from the index phosphor of the detection signal at a predetermined position, and using this signal to control the initial settings for detection of abnormal operation and maintenance of normal operation.

Figure 22A:
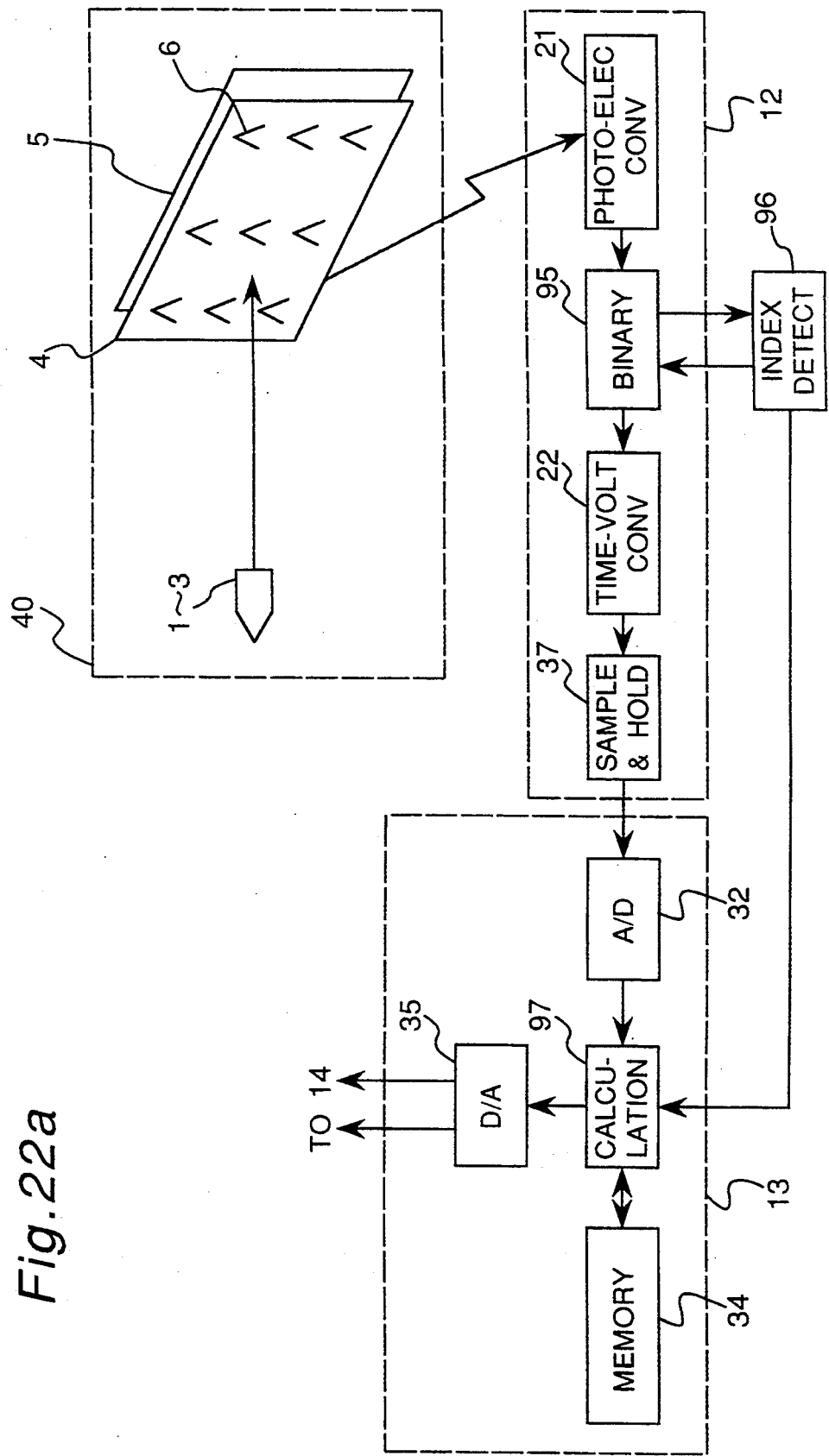
FIG. 22a is a block diagram of an image correction apparatus according to the fifth embodiment of the invention.

Referring to FIG. 22a, this embodiment additionally comprises a binary circuit 95 for converting the analog photoelectric conversion signal from the photoelectric conversion element 21 into a binary digital signal, an index number detection circuit 96 for evaluating whether the index signal for a predetermined number is detected based on the signal output from the binary circuit 95, and an calculation circuit 97 for controlling the correction operation based on the signal from the index detection circuit 96. Note that like components in the second and fifth embodiments are identified by like references in FIG. 22a, and further description of said like components is omitted below.

Figure 22B:
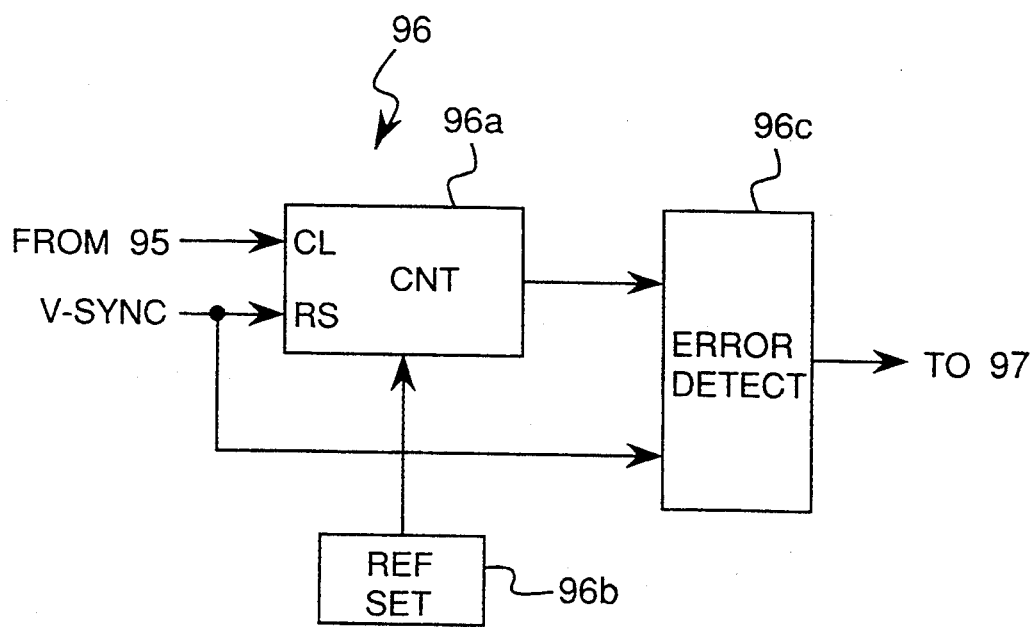
FIG. 22b is a block diagram of index detector shown in FIG. 22a, FIG. 23a is a diagram showing the relationship between the index phosphors and test signals.

As shown in FIG. 22b, the index detection circuit 96 comprises a counter 96a, a reference number setting circuit 96b for setting a reference number which should be counted by the counter 96a, and an error detector 96c for detecting an error. The number set in the reference number setting circuit 96b is the expected number of index phosphors to be detected. Since the number of index phosphors is known once the CRT is assembled, it is possible to set the reference number. The counter 96a is reset by each V-sync pulse and counts the pulses representing index phosphors. For example, when the reference number setting circuit 96b sets "five", counter 96a produces a pulse after counting five pulses, that is after five index phosphors are detected. Then, the counter is reset to zero by the V-sync pulse. In this case, error detector 96c produces no error signal. If counter 96a is reset before counting "five", it is understood that one or more index phosphors has been missed from the detection. In this case, the error detector 96c produces an error signal. Similarly, if counter 96a counts more than "five", the error detector 96c also produces an error signal.

The error signal is applied to calculation circuit 97 to inform that the data obtained in this cycle is not reliable.

Figure 23A:
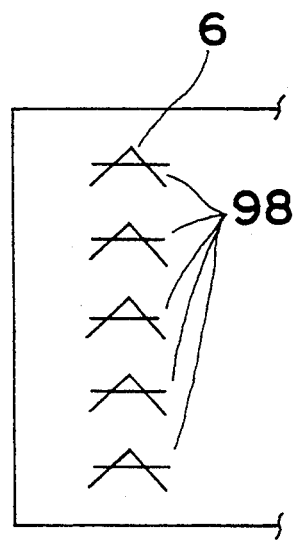
FIG. 23b is a diagram showing waveforms used to describe the operation of the fifth embodiment of the invention.
Figure 23B:
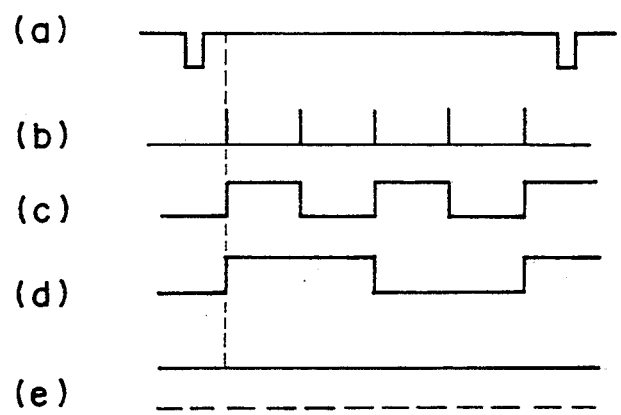
Figure 24:
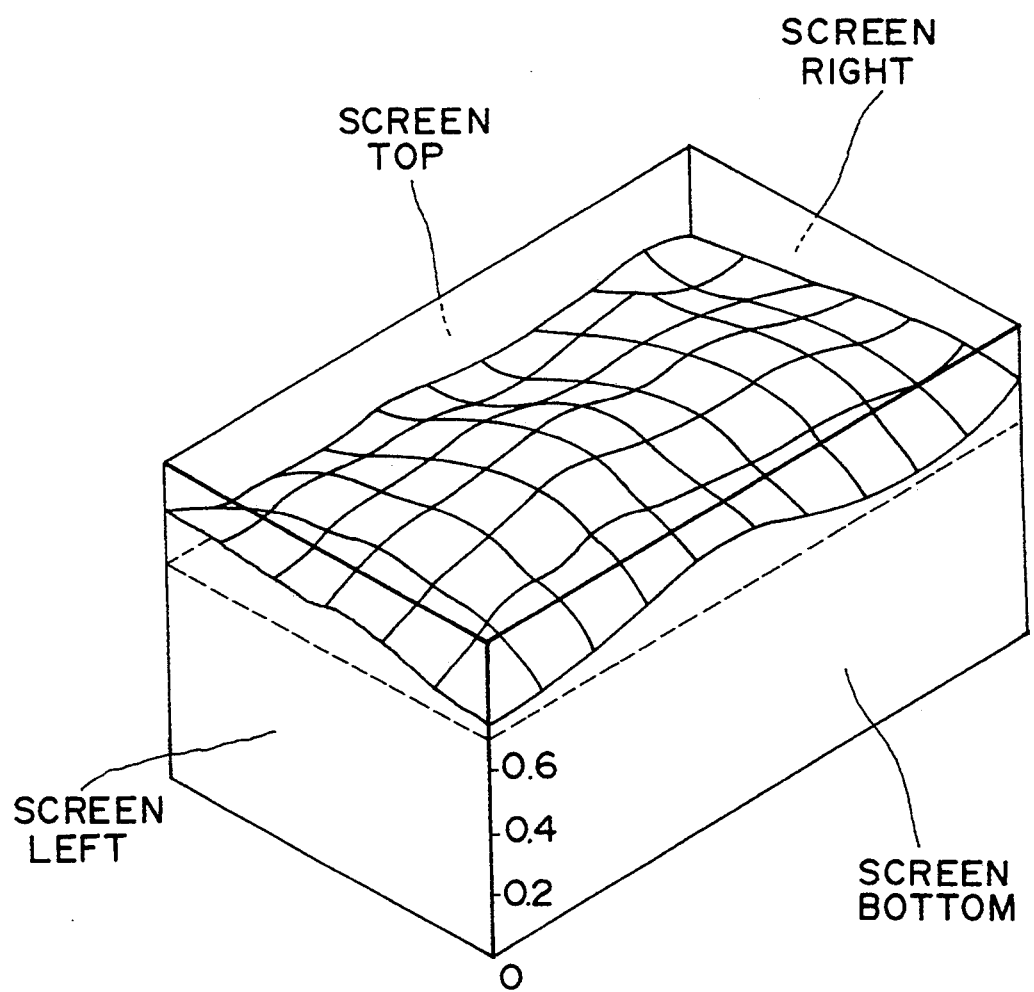
FIG. 24 is a three-dimensional characteristics graph used to describe the operation of the fifth embodiment of the invention.

The screen images and waveform diagrams in FIG. 23 and the luminance distribution graph in FIG. 24 are used to further describe the cathode ray tube control apparatus according to this embodiment below.

The five index phosphors on the left side of the CRT 40 are shown in FIG. 23a with the horizontal test signal 98 scanning across the phosphors. This left-side horizontal bar signal scanning period is the operating mode for both vertical and horizontal correction.

To correct the vertical convergence from this mode as shown on the left side of FIG. 23a, the binary signal digitized by the binary circuit 95 from the photoelectric conversion signal output from the photoelectric conversion element 21 is synchronized to the horizontal synchronizing signal, resulting in a five pulse signal as shown in FIG. 23b(b). When correcting the horizontal convergence as shown on the right side in FIG. 23a, the binary signal digitized by the binary circuit 95 from the photoelectric conversion signal output from the photoelectric conversion element 21 is similarly synchronized to the horizontal synchronizing signal (FIG. 23b(a)), resulting in a five pulse signal as shown in FIG. 23b(c).

The binary signal output from the binary circuit 95 is supplied to the index detection circuit 96, which continually evaluates whether the five-pulse signal is output synchronized to the vertical synchronizing signal. The index detection circuit 96 may be a flip-flop circuit that evaluates whether the results are always constant at a known period as shown in FIG. 23b(c)–(e). The evaluation signal from the index detection circuit 96 is fed back to the binary circuit 95 for reference potential control, and to the calculation circuit 97 for correction control.

As shown in FIG. 24, the luminance distribution of a CRT typically drops near the edges of the screen due to geomagnetism and the deflection angle. This means that binarization is not always normal due to the detection position and CRT luminance drift. When the normal index signal is not output, operation of the corrected waveform generator 13 is therefore stopped based on the evaluation signal output by the index detection circuit 96. The reference potential of the binary circuit 95, which comprises a comparator, is also controlled to output the normal index signal.

The cathode ray tube control apparatus according to the fifth embodiment can thus achieve a completely adjustment-free cathode ray tube because false detection of operating errors in the detection system caused by the index signal can be automatically detected by evaluating whether the detection signal corresponding to the position detection element at a predetermined position is output, and controlling the deflection means to control correction of electron beam deflection distortion based on the evaluation signal.

The sixth embodiment of the invention is described below with reference to FIGS. 25–27. This embodiment differs from the first in shifting the test signal between adjustment points and calculating the correction required between adjustment points.

Figure 25:
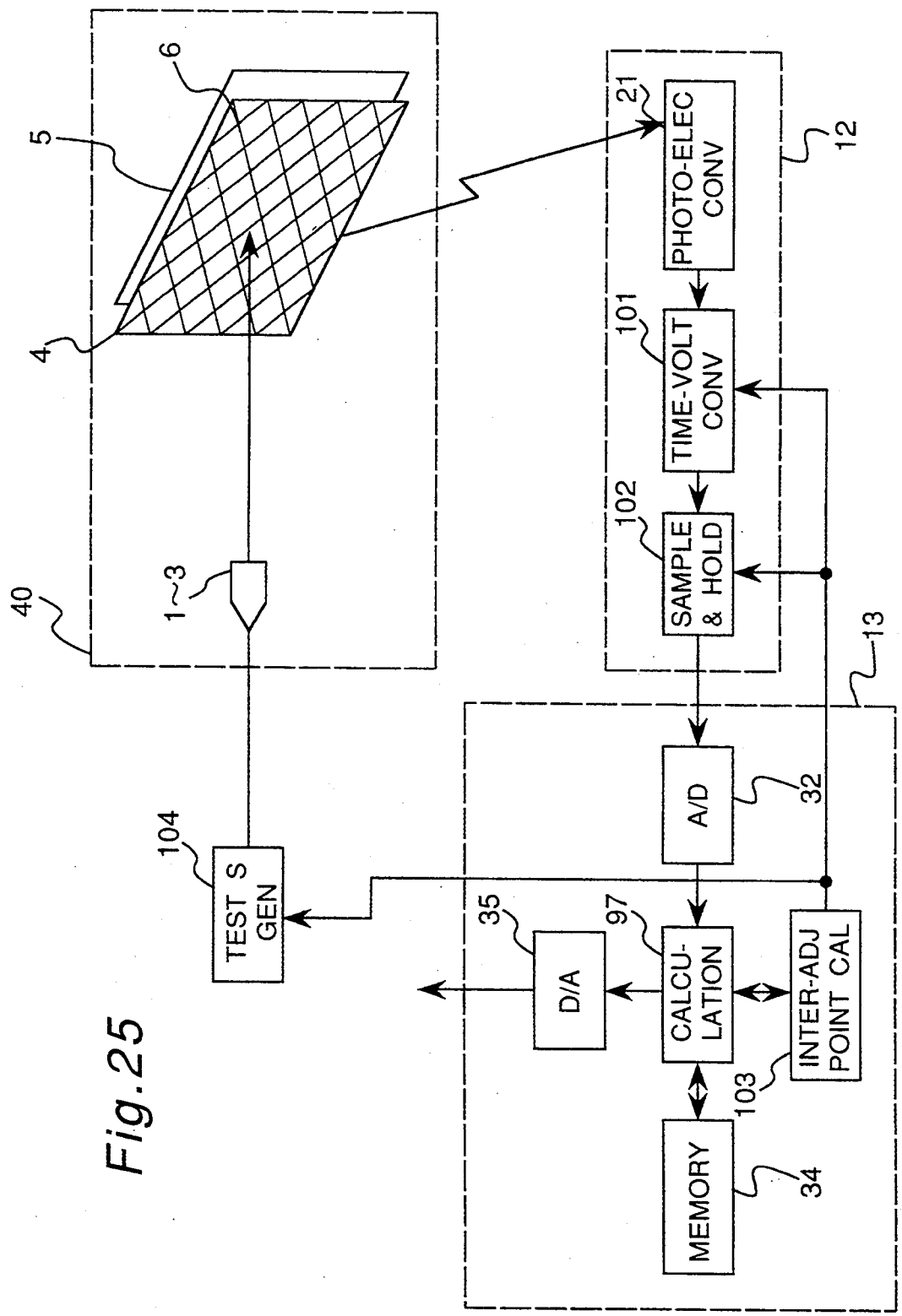
FIG. 25 is a block diagram of an image correction apparatus according to the sixth embodiment of the invention.

Referring to FIG. 25, this embodiment additionally comprises a time-voltage converter 101 for converting the time base expressing the position shift of the index signal to a voltage, a sample-hold circuit 102 for sampling and holding the peak voltage of the time-voltage converted signals, an inter-adjustment point calculation circuit 103 for calculating the correction data between adjustment points, and a test signal generator 104 for generating the test signals on screen. Note that like components in the second and sixth embodiments are identified by like references in FIG. 25, and further description of said like components is omitted below.

Figure 26A:
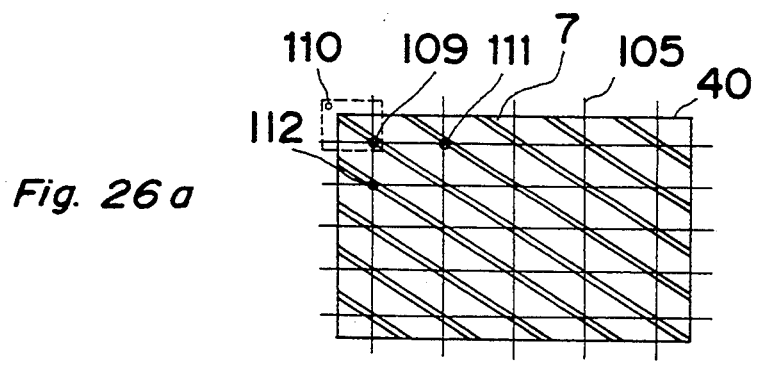
FIGS. 26a, 26b, 26c and 26d show the relationship between the screen and the correction data used to describe the operation of the sixth embodiment of the invention.
Figure 26B:
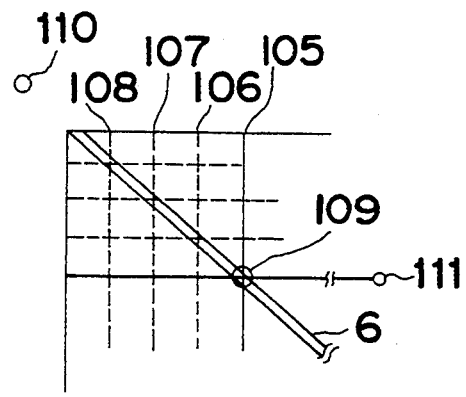
Figure 26C:
Figure 26D:
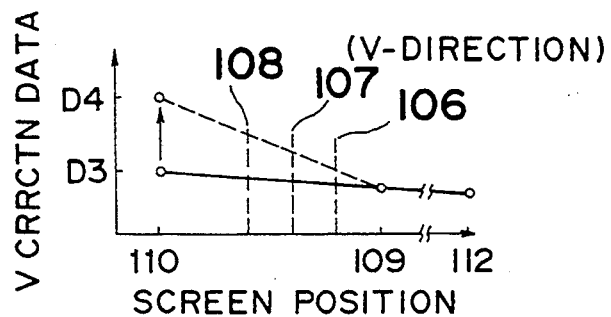
Figure 27:
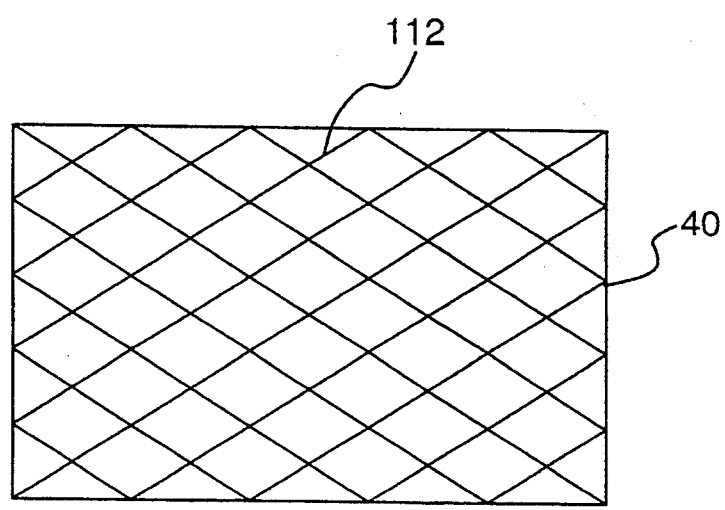
FIG. 27 is a diagram of index phosphor used to describe the operation of the sixth embodiment of the invention.
Figure 28:
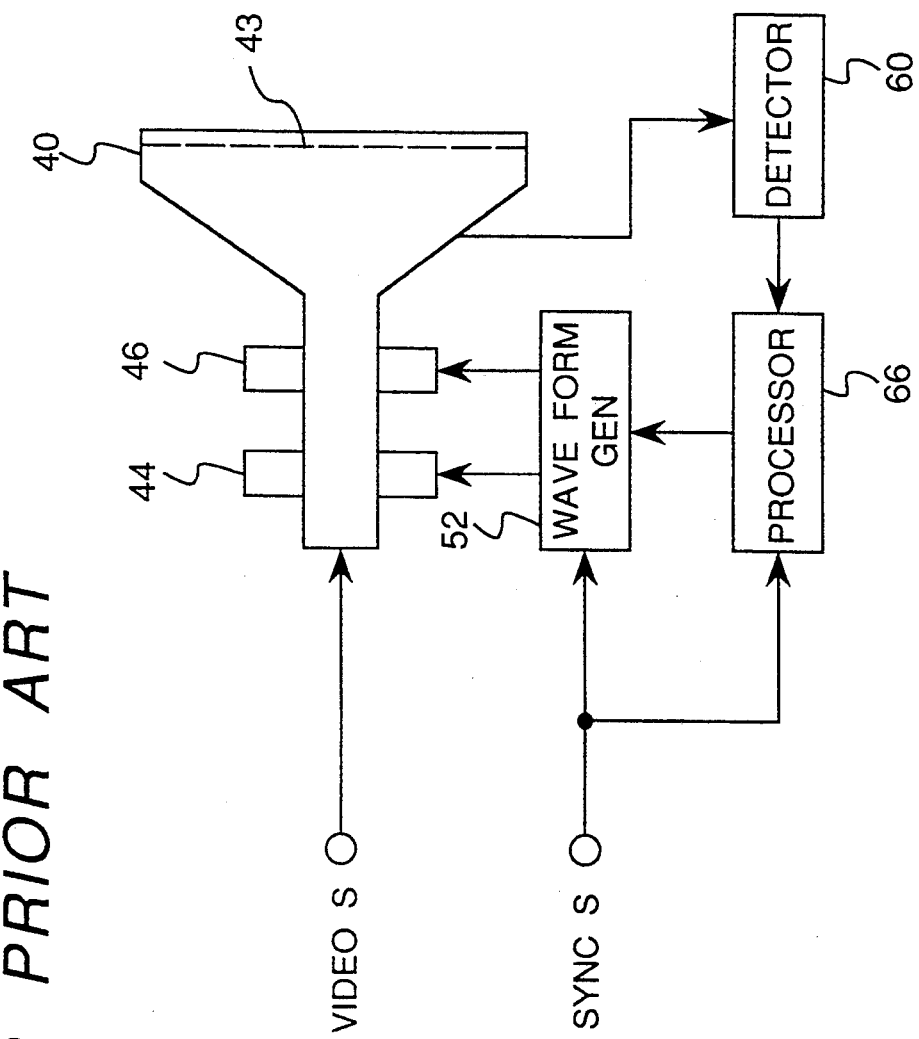
FIG. 28 is a block diagram of a cathode ray tube control apparatus according to the prior art.
Figure 29A:
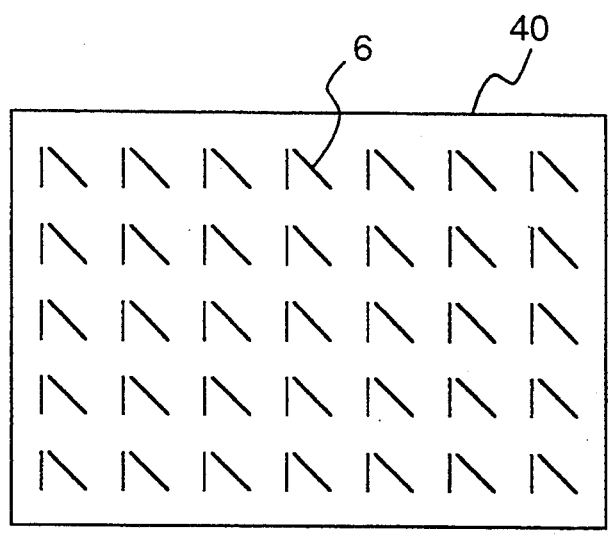
FIG. 29a is a screen image of the index phosphors according to the prior art.
Figure 29B:
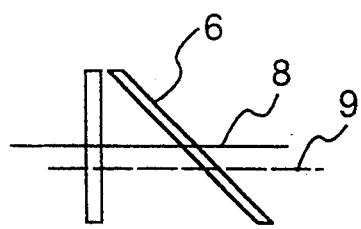
FIG. 29b is a diagram of the index phosphor according to the prior art.

The screen images and graphs in FIGS. 26a–26d and the index shape map in FIG. 27 are used to describe the cathode ray tube control apparatus according to this embodiment below. It is to be noted that the operation performed to obtain the correction data between on-screen adjustment points is relatively simple, and the following description therefore considers the more difficult extrapolation operation required for data outside the screen area. To simplify the explanation, a simple series of diagonal index phosphors is assumed. FIG. 26a shows the screen area with the test signals 105 scanning the diagonal index phosphors 7 of the CRT 40, and FIG. 26b is an enlarged view of the top left corner of FIG. 26a. The extrapolation point 110 shown in FIGS. 26a and 26b is obtained by calculation from the correction data for the adjustment points 109, 111, and 112 inside the screen area. The correction data for selected screen positions are shown in the graphs of FIGS. 26c and 26d. As will be known from these graphs, the correction data for the extrapolation point 110 is obtained by linear approximation or another extrapolation method from the known vertical and horizontal correction data for selected points.

The test signal generator 104 shown in FIG. 25 generates the test signals 106, 107, 108 (shown by dotted lines in FIG. 26b) between the adjustment points, and the offset between adjustment points is measured by the time-voltage converter 101 and sample-hold circuit 102. The detected offset between adjustment points in each direction is shown on the dotted line in FIGS. 26c and 26d. The detection signal for this offset is input through the ADC 32 and calculation circuit 97 to the inter-adjustment point calculation circuit 103. The inter-adjustment point calculation circuit 103 detects the offset between the adjustment points shown in FIGS. 26c and 26d, and calculates the best correction data for the extrapolation point 110. Therefore, by extrapolation using linear approximation in the horizontal direction as shown in FIG. 26c, the correction data D1 is calculated for correction data D2 by detecting the data between the adjustment points.

Similarly, correction data D4 is calculated by detecting the data between the adjustment points for correction data D3 by extrapolation using linear approximation in the vertical direction as shown in FIG. 26d, and high precision extrapolation is possible. The calculation sequence for the data between adjustment points starts by obtaining the correction data for the adjustment points, sequentially moving the test signal for detected between adjustment points and obtaining the offset, and then obtaining the correction data between adjustment points based on this offset data. It is to be noted that detection and calculation of data between the adjustment points is possible with this embodiment because continuous diagonal index phosphors 112 as shown in FIG. 27 are coated and used for detection.

The cathode ray tube control apparatus according to the sixth embodiment can thus achieve high precision correction around the screen edges because the correction precision between adjustment points can be improved and, in particular, the correction amount for extrapolated points outside the display area can be automatically calculated by moving the test signals between adjustment points to calculate the correction data between those adjustment points.

It is to be noted that a CRT display device is used by way of example in the first through fifth embodiments above to simplify understanding, but the invention shall not be so limited. In addition, the first through fifth embodiments are also described with the index phosphors coated to the shadow mask surface for beam interruption, but another beam interruption plane can also be used. Furthermore, these embodiments use digital processing to generate the corrected waveform, but analog processing can also be used.

In addition, the index phosphors can be of various diagonal configurations even though the index phosphors of the first embodiment are shaped like the non-continuous side members of an equilateral triangle.

In the second embodiment the data for correcting the offset between the detection surface and the display surface is stored in a ROM device, but the distance between the shadow mask surface and the phosphor surface can be calculated from the position offset on the phosphor display surface to enable automatic correction.

The third embodiment was described with the position detection means detecting the center position, but the weighted center or the average signal value can also be detected.

The fourth embodiment was described with the means for generating the sequential scan test signal controlling test signal generation, but sequential scanning can also be performed by controlling scanning by the deflection circuit.

The fifth embodiment was described with the correction operation controlled according to the evaluation signal, but the signal level or time measurement conditions can also be set.

The sixth embodiment was described with linear approximation being used to obtain the correction data between adjustment points, but a different curve approximation method can also be used.

As thus described above, the first embodiment of the invention comprises detection elements, each being two shapes diagonal to the main scanning direction of the electron beam, arrayed at predetermined positions on the shadow mask surface and generating a signal according to the electron beam scan, and a means for detecting the two-dimensional position of the electron beam and deflecting the electron beam according to the detection element output signals. This first embodiment thus achieves an index phosphor-coated cathode ray tube of simple construction by detecting the two-dimensional position of the electron beam based on the output signals from the detection elements. In addition, by using an index phosphor coating in which each index phosphor forming the detection elements comprises two continuous, diagonal line elements, the construction can be simplified even more, and the invention can be flexibly adapted to a variable number of convergence correction points. Finally, high precision correction is possible because good position detection precision is achieved as the result of the detection range being limited and the weighted center of the detection positions being close.

With the second embodiment of the invention, error due to an offset between the display surface and the detection surface on which the index phosphors are coated can be corrected, and high precision convergence correction can thus be achieved, by obtaining the two-dimensional position of the electron beam from the distance between the shadow mask surface and the phosphor surface and the electron beam detection signal obtained from the shadow mask surface, and controlling the deflection means to correct the deflection distortion of the electron beam. The construction of the cathode ray tube can also be simplified and the invention can be flexibly adapted to a variable number of convergence correction points by using detection means of two members positioned diagonally to the main scanning direction of the electron beam. In addition, a cathode ray tube requiring no convergence adjustment can be achieved by the operating means calculating the distance between the shadow mask and phosphor surfaces from the two-dimensional offset on the phosphor surface.

The third embodiment of the invention can compensate for correction error due to the beam spot size and aberrations, and high precision correction can thus be obtained, by obtaining the two-dimensional position of the electron beam from the detection signals based on the feedback signal of the electron beam from the shadow mask and the width of each detection signal, and correcting the electron beam deflection distortion based on this signal. In addition, by using an index phosphor coating in which each index phosphor forming the detection elements comprises two continuous, diagonal line elements, the construction can be simplified and can be flexibly adapted to a variable number of convergence correction points.

The fourth embodiment of the invention enables high precision convergence correction because stable, high precision measurement of the electron beam position is made possible by sequentially outputting the sequential scan detection test signal to the detection means to obtain the two-dimensional position of the electron beam, and controlling the deflection means according to this signal to correct the deflection distortion of the electron beam.

The fifth embodiment of the invention achieves a display device requiring absolutely no adjustment because false detection of abnormal operation in the detection system caused by the signals from the position detection elements can be automatically detected by determining whether the detection signal corresponding to the position detection element at a predetermined position is output, and controlling the deflection means, and thus the correction operation applied for deflection distortion of the electron beam, according to this signal.

The sixth embodiment of the invention enables high precision correction around the image area, an extremely utilitarian capability, because the correction precision between adjustment points is improved and the correction amount for extrapolated points outside the screen area can be automatically calculated by moving the test signal between adjustment points and calculating the correction amount between adjustment points.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cathode ray tube control apparatus comprising:
   a phosphor display screen;
   first, second and third electron gun means for emitting an electron beam to the phosphor display screen;
   beam mask means placed between the electron gun means and the phosphor display screen;
   detection index means having at least two line elements diagonal to a horizontal scanning direction of the electron beam and arrayed at predetermined positions on the surface of the beam mask for generating a signal according to the electron beam scan;
   detecting means for detecting beam crossing points over said detection index means;
   correction circuit means for correcting the deflection of the electron beam based on the detected beam crossing points, said correction circuit means comprising an index number detection means for counting a number of detected index means and for generating an error signal when the counted index number is not equal to a predetermined number.

2. The cathode ray tube control apparatus according to claim 1, wherein said detection index means is defined by two groups of continuous diagonal lines, one group slanted in a first direction with respect to the horizontal scanning direction, and another group slanted in a second direction, opposite to the first direction.

3. The cathode ray tube control apparatus according to claim 1, wherein said correction circuit means comprises a memory means for storing correction data for correcting a beam deviation caused by travel of the beam between the beam mask means and the phosphor display screen.

4. The cathode ray tube control apparatus according to claim 1, wherein said correction circuit means comprises a center position detection means for detecting a center position of a portion of one of the line elements where the beam intersects.

5. The cathode ray tube control apparatus according to claim 1, wherein said correction circuit means comprises no-interlace circuit for driving said first, second and third electron gun means to scan in no-interlaced manner.

6. A cathode ray tube control apparatus comprising:
   a phosphor display screen;
   first, second, and third electron gun means for emitting an electron beam to the phosphor display screen;
   beam mask means placed between the electron gun means and the phosphor display screen;
   detection index means having at least two line elements diagonal to a horizontal scanning direction of the electron beam and arrayed at predetermined positions on the surface of the beam mask for generating a signal according to the electron beam scan;
   detecting means for detecting beam crossing points over said detection index means; and
   correction circuit means for correcting the deflection of the electron beam based on the detected beam crossing points, said correction circuit means comprising a memory means for storing correction data for correcting a beam deviation caused by travel of the beam between the beam mask means and the phosphor display screen.

7. A cathode ray tube control apparatus comprising:
   a phosphor display screen;
   first, second, and third electron gun means for emitting an electron beam to the phosphor display screen;
   beam mask means placed between the electron gun means and the phosphor display screen;
   detection index means having two line elements and defined by two groups of continuous diagonal lines, one group slanted in a first direction with respect to the horizontal scanning direction, and another group slanted in a second direction, opposite to the first direction for generating a signal according to the electron beam scan;
   detecting means for detecting beam crossing points over said detection index means; and
   correction circuit means for correcting the deflection of the electron beam based on the detected beam crossing points, said correction circuit means comprising a memory means for storing correction data for correcting a beam deviation caused by travel of the beam between the beam mask means and the phosphor display screen.

8. The cathode ray tube control apparatus according to claim 6, wherein said correction circuit means comprises an index number detection means for counting a number of detected index means and for generating an error signal when the counted index number is not equal to a predetermined number.

9. The cathode ray tube control apparatus according to claim 7, wherein said correction circuit means comprises an index number detection means for counting a number of detected index means and for generating an error signal when the counted index number is not equal to a predetermined number.

* * * * *